(12) United States Patent
Cao et al.

(10) Patent No.: US 12,304,063 B2
(45) Date of Patent: May 20, 2025

(54) SOFT GRIPPER APPARATUS

(71) Applicant: Board of Trustees of Michigan State University, East Lansing, MI (US)

(72) Inventors: Changyong Cao, Okemos, MI (US); Xiaobo Tan, Okemos, MI (US); Yaokun Pang, East Lansing, MI (US); Shoue Chen, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 862 days.

(21) Appl. No.: 17/515,628

(22) Filed: Nov. 1, 2021

(65) Prior Publication Data

US 2022/0134579 A1 May 5, 2022

Related U.S. Application Data

(60) Provisional application No. 63/108,470, filed on Nov. 2, 2020.

(51) Int. Cl.
*B25J 15/12* (2006.01)
*B25J 13/08* (2006.01)
*B25J 15/10* (2006.01)

(52) U.S. Cl.
CPC .............. *B25J 15/12* (2013.01); *B25J 13/081* (2013.01); *B25J 13/087* (2013.01); *B25J 15/10* (2013.01)

(58) Field of Classification Search
CPC ........ B25J 15/0233; B25J 15/10; B25J 15/12; B25J 11/0045; B25J 13/081; B25J 13/082; B25J 13/084; B25J 13/087
See application file for complete search history.

(56) References Cited

U.S. PATENT DOCUMENTS 4,990,813 A 2/1991 Paramo
6,718,766 B2 4/2004 Seto et al.
(Continued)

FOREIGN PATENT DOCUMENTS

DE 102016201540 A1 * 8/2017 ............ B25J 13/082
KR 2016-0148755 A 12/2016
(Continued)

OTHER PUBLICATIONS

Chen, J., et al., "Bladeless-Turbine-Based Triboelectric Nanogenerator for Fluid Energy Harvesting and Self-Powered Fluid Gauge," Advanced Materials Technologies, 1800560 (2018).
(Continued)

*Primary Examiner* — Stephen A Vu
(74) *Attorney, Agent, or Firm* — Harness, Dickey & Pierce, PLC

(57) ABSTRACT

A soft gripper apparatus is provided. In another aspect, a soft gripper includes tribo-skin pressure sensors, an internal bending sensor, at least one flexible gripping finger and an actuator. A further aspect of a soft gripper apparatus employs longitudinally elongated, laterally spaced apart and self-powering, electrically conductive strips that sense and send a bending signal to a programmable controller indicative of a bending angle of a gripping finger within which the strips are encapsulated. Another aspect of a gripping apparatus includes at least one workpiece pressure sensor and/or at least one bending sensor, which are connected to a programmable controller and electrical circuit to automatically determine a characteristic of the workpiece.

27 Claims, 20 Drawing Sheets

(56) References Cited

U.S. PATENT DOCUMENTS

| | | | |
|---|---|---|---|
| 7,198,594 B2* | 4/2007 | Shahinpoor | A61M 60/161 600/16 |
| 7,591,166 B2* | 9/2009 | Ueda | B25J 13/084 73/9 |
| 7,982,375 B2 | 7/2011 | Tan et al. | |
| 8,022,563 B2 | 9/2011 | Lemieux | |
| 9,394,875 B2 | 7/2016 | Wang et al. | |
| 9,394,876 B2 | 7/2016 | Zuo et al. | |
| 9,543,860 B2 | 1/2017 | Wang et al. | |
| 9,545,727 B1* | 1/2017 | Shamlian | B25J 9/1045 |
| 9,571,009 B2 | 2/2017 | Wang et al. | |
| 9,903,788 B2 | 2/2018 | Zhu et al. | |
| 9,993,921 B2 | 6/2018 | Lessing et al. | |
| 10,449,676 B2* | 10/2019 | Monsarrat | B25J 9/1653 |
| 10,574,155 B2 | 2/2020 | Song et al. | |
| 2013/0222115 A1 | 8/2013 | Davoodi et al. | |
| 2014/0109560 A1 | 4/2014 | Ilievski et al. | |
| 2016/0218640 A1 | 7/2016 | Wang et al. | |
| 2020/0156266 A1* | 5/2020 | Curhan | B25J 15/0658 |
| 2020/0161990 A1* | 5/2020 | Lin | H02N 1/04 |
| 2020/0374604 A1 | 11/2020 | Park et al. | |
| 2021/0211072 A1 | 7/2021 | Cao et al. | |
| 2021/0276665 A1 | 9/2021 | Tan et al. | |
| 2022/0066441 A1 | 3/2022 | Tan et al. | |

FOREIGN PATENT DOCUMENTS

| | | |
|---|---|---|
| KR | 10-1727242 B1 | 4/2017 |
| KR | 2017-0043243 A | 4/2017 |
| KR | 2020-0005296 A | 1/2020 |

OTHER PUBLICATIONS

Gong, Y., et al., "Capturing Flow Energy From Ocean and Wind," Energies, 12, 2184 (2019).

Hu, W., et al., "Recent progress in piezotronics and tribotronics," Nanotechnology 30, 042001 (2019).

Jiang, T., et al., "Structural Optimization of Triboelectric Nanogenerator for Harvesting Water Wave Energy," ACS Nano, 12562-72 (Nov. 14, 2015).

Jiang, T., et al., "Spring-assisted triboelectric nanogenerator for efficiently harvesting water wave energy," Nano Energy 31 (2017) pp. 560-567.

Lee, K., et al., "A Spherical Hybrid Triboelectric Nanogenerator for Enhanced Water Wave Energy Harvesting," Micromachines 9, 598 (Nov. 15, 2018).

Lin, Z., et al., "A Triboelectric Nanogenerator-Based Smart Insole for Multifunctional Gait Monitoring," Advanced Materials Technologies (2018) 1800360.

Nie, J., et al., "Electrically Responsive Materials and Devices Directly Driven by the High Voltage of Triboelectric Nanogenerators," Advanced Functional Materials (2018) 1806351.

Quin, H., et al., "High Energy Storage Efficiency Triboelectric Nanogenerators with Unidirectional Switches and Passive Power Management Circuits," Advanced Functional Materials (2018) 1805216.

Tian, Z., et al., "A Shared-Electrode and Nested-Tube Structure Triboelectric Nanogenerator for Motion Energy Harvesting," Micromachines (2019) 10, 656.

Wang, J., et al., "Sustainably power wearable electronics solely by biomechanical energy," Nature Communications, 7:12744 (Sep. 28, 2016).

Wang, Z., et al., "Toward the blue energy dream by triboelectric nanogenerator networks," Nano Energy 39 (Jun. 22, 2017) 9-23.

Wu, C., et al., "Triboelectric Nanogenerator: A Foundation of the Energy for the New Era," Advanced Energy Materials (2018) 1802906.

Xu, M., et al., "A highly-sensitive wave sensor based on liquid-solid interfacing triboelectric nanogenerator for smart marine equipment," Nano Energy (2018).

Yin, X., et al., "Structure and Dimension Effects on the Performance of Layered Triboelectric Nanogenerators in Contact-Separation Mode," ACS Nano (Dec. 24, 2018).

Yong, H., et al., "Highly reliable wind-rolling triboelectric nanogenerator operating in a wide wind speed range," www.nature.com/ScientificReports, 6:33977 (Sep. 22, 2016).

Wang, P., et al., "An Ultra-Low-Friction Triboelectric-Electromagnetic Hybrid Nanogenerator for Rotation Energy Harvesting and Self-Powered Wind Speed Sensor," ACS Nano (2018) 12, 9433-9440.

Wu, Z., et al., "A Hybridized Triboelectric-Electromagnetic Water Wave Energy Harvester Based on a Magnetic Sphere," ACS Nano (2019) 13, 2349-2356.

Yang, Y., et al., "Bioinspired Robotic Fingers Based on Pneumatic Actuator and 3D Printing of Smart Materials," Soft Robotics, vol. 4, No. 2, p. 147-162 (2017).

Pang, Y., et al., "Matryoshka-inspired Hierarchically Structured Triboelectric Nanogenerators for Wave Energy Harvesting," Nano Energy, vol. 66, No. 104131 (Dec. 2019).

* cited by examiner

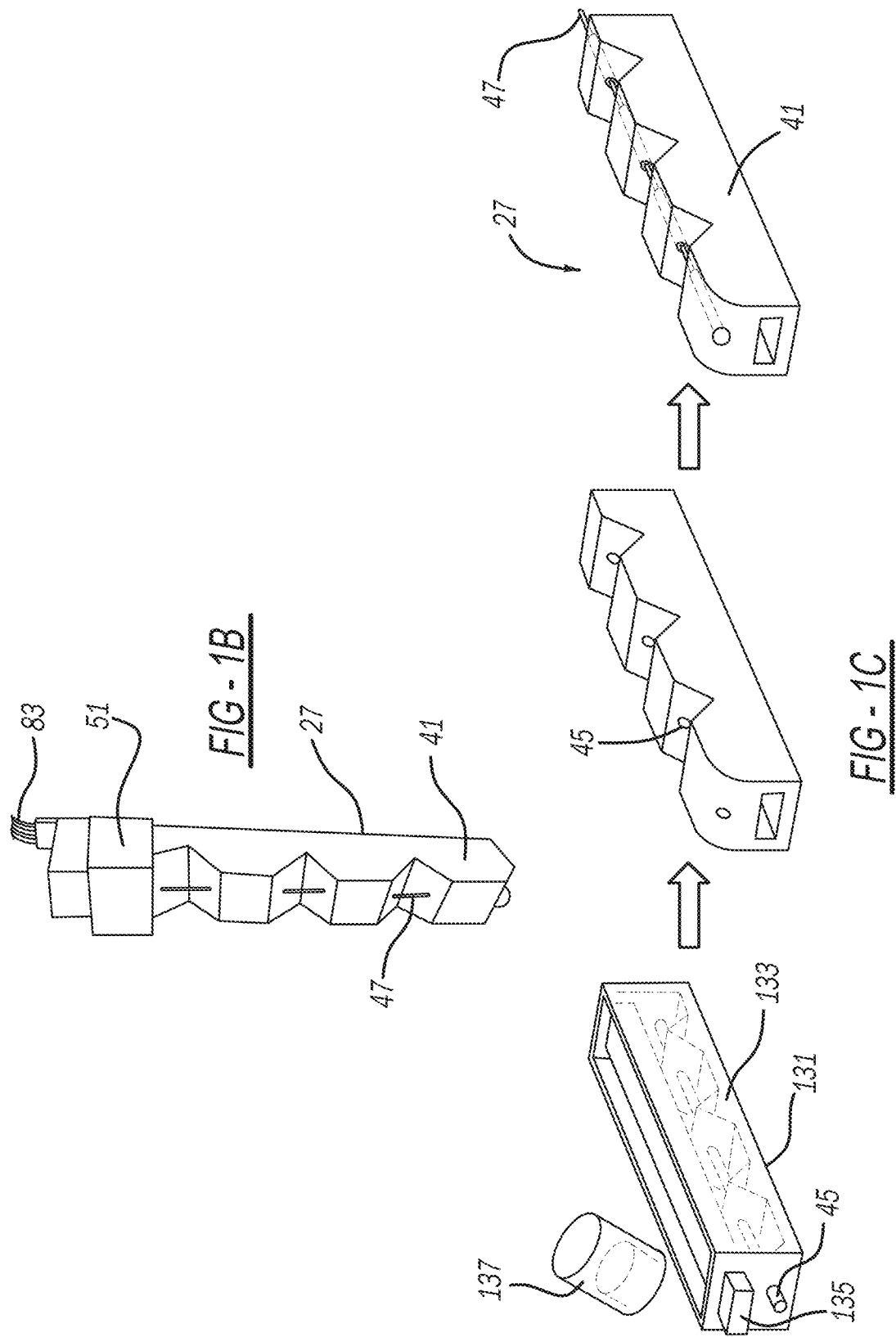

SOFT GRIPPER APPARATUS

CROSS-REFERENCE TO RELATED APPLICATIONS

This application claims priority to provisional patent application Ser. No. 63/108,470 filed on Nov. 2, 2020, which is incorporated by reference herein.

GOVERNMENT SUPPORT

This invention was made with government support under 1016788 awarded by the U.S. Department of Agriculture. The government has certain rights in the invention.

BACKGROUND AND SUMMARY

The present disclosure generally pertains to a soft gripper apparatus and more particularly to a soft gripper including tribo-skin pressure sensors, internal bending sensors, a flexible external gripper and an actuator.

Traditional end effectors or grippers are coupled to robotic arms for achieving grasping and manipulating functions in a variety of tasks, ranging from picking up and holding objects, to digging and sorting, to locomotion and scratching. Inspired by human hands, the majority of traditional robotic grippers are made of assembled rigid joints and links to obtain multiple degrees of freedom for realizing complex gestures or operations. The actuators used for these grippers are installed in the links, joints or gripper base and driven by cables or tendon-like structures. A variety of proprioceptive sensors are usually integrated with the grippers, examples of which include tendon tension sensors, torque sensors, encoders, and Hall-effect sensors, to determine the position and velocity of the gripper components, while different kinds of exteroceptive sensors like pressure sensors, electromagnetic sensors and resistive and capacitive sensors are deployed to gather sensory data about the physical properties of the objects. These traditional rigid grippers face challenges in achieving high flexibility and dexterity like human hands, safe interactions with humans and environments, and grasping and manipulating soft or fragile objects.

Many different actuation methods have been explored for soft actuators. Conventional examples include pneumatic or hydraulic actuation and actuation based on soft active materials, such as shape memory alloy and electroactive polymers. Pneumatic or hydraulic actuation-based grippers disadvantageously require additional equipment for supplying air or hydraulic pressure, hindering the dexterity and miniaturization of the whole system. Soft grippers designed based on shape memory alloys tend to have relatively slow response due to the heating and cooling processes, and thus are not suitable for applications demanding fast speed. Moreover, dielectric elastomers require very high voltages (typically in the range of kilovolts) to produce enough strains or stresses for the actuation, posing safety risks in many applications.

One exemplary conventional flexible actuator employs a piezoelectric diaphragm pump connected to fluid chambers with adjacent acoustic wave sensors. Elastic tubes, having accordion walls, movably hold an object therebetween in response to fluid movement by the pump. This traditional device is disclosed in U.S. Pat. No. 6,718,766 entitled "Pump-integrated Flexible Actuator" which was issued to Seto et al. on Apr. 13, 2004, and is incorporated by reference herein. U.S. Pat. No. 9,993,921 entitled "Flexible and Stretchable Electronic Strain-Limited Layer for Soft Actuators" was issued to Lessing et al., and discloses a pneumatically activated soft robot employing deposited and stretchable electronics such as piezo-resistive c-PDMS sensors or photovoltaic sensors; this patent is incorporated by reference herein.

Another conventional soft gripper includes a flexible molded body having interconnected chambers which are fluid pressurized by an air microcompressor or water electrolyzer to cause bending of the body. This traditional device is disclosed in U.S. Patent Publication No. 2014/0109560 entitled "Soft Robotic Actuators" which was issued to Ilievski et al. on Apr. 24, 2014, and is incorporated by reference herein. Other traditional soft pneumatic grippers, using polylactic acid segments interlocked with shape memory polymer joints, are discussed in Yang, Y., et al., "Bioinspired Robotic Fingers Based on Pneumatic Actuator and 3D Printing of Smart Materials," Soft Robotics, vol. 4, no. 2, p. 147-162 (2017). Page 147 of the Yang publication recognizes that "applications of soft robots are still limited due to some constraints, such as insufficient stiffness variation and difficulties in precision control."

To enable the feedback control and probe the environment, various sensors need to be integrated with conventional soft robots and grippers. Conventional strain and pressure sensors employed in the soft robots mainly include resistive sensors, capacitive sensors, piezoelectric sensors and optical sensors. Resistive sensors undesirably require an external power source, piezoelectric sensors usually have limited strain ranges, and optical sensors require rigid cameras.

In accordance with the present invention, a soft gripper apparatus is provided. In another aspect, a soft gripper includes tribo-skin pressure sensors, an internal bending sensor, at least one flexible gripping finger and an actuator. A further aspect of a soft gripper apparatus employs longitudinally elongated, laterally spaced apart and self-powering, electrically conductive strips that sense and send a bending signal to a programmable controller indicative of a bending angle of a gripping finger within which the strips are encapsulated. In yet another aspect, a soft gripper apparatus includes a flexible, compressible, elastomeric and longitudinally elongated finger with valleys or depressions between adjacent pairs of raised digits, with a cable internally located in the finger, and an elongated and laterally flexible substrate internally located within the finger. Moreover, another aspect of a gripping apparatus includes at least one workpiece pressure sensor and at least one bending sensor, which are connected to a programmable controller and electrical circuit to automatically determine at least one of the following characteristics of the workpiece: weight, exterior shape or profile, and size. In still a further aspect, the controller determines if a delicate workpiece, such as a glass object or food (e.g., fruit, vegetable, egg), gripped by one or more soft and bendable fingers, is of a desirable characteristic based on sensed output signals from sensors of the finger(s) which are compared to pre-stored and acceptable maximum and minimum threshold values. Another object of the present gripper apparatus is an inductive workpiece pressure sensor or tribo-skin patch, located adjacent an exterior of a gripping finger, which includes a silver nanowire (AgNW) thin film electrode on a PTFE polymeric film.

The present apparatus is advantageous over conventional devices. For example, soft grippers of the present apparatus can beneficially continuously deform, and can safely and gently interact with human and fragile objects without getting damaged. Furthermore, due to their intrinsic softness, such grippers can easily form a conformal contact with objects of sophisticated geometry using a simple control strategy (by exploiting morphological computing), which is a challenge for traditional rigid grippers.

Furthermore, triboelectric nanogenerators ("TENGs") of the present gripper apparatus based on contact electrification and electrostatic induction are advantageous for generating electricity by exploiting mechanical energy such as human body motions. The generated electrical voltage by TENGs can also be utilized as a response signal to identify changes in motion or deformation of structures induced by environmental stimuli without the need of an additional power source. Such a self-powered TENG sensor in the present gripper apparatus has desirable advantages, such as low cost, low weight, high sensitivity, excellent versatilities in structural designs, and environment-friendliness. Additionally, the present TENG sensors have high flexibility and stretchability, ideally suited for the present soft robotics applications. The present soft sensors possess high sensitivity, reliability, compliance and flexibility, large measurement range, ease of use and maintenance, and moderate cost. Additional advantageous and features of the present system and method will become apparent from the following description and appended claims, taken in conjunction with the accompanying drawings.

BRIEF DESCRIPTION OF THE DRAWINGS

FIG. 1B is a perspective view showing the finger of the present soft gripper;

FIG. 1C is a series of perspective views showing a fabrication process for the finger of the present soft gripper;

DETAILED DESCRIPTION

Figure 1A:
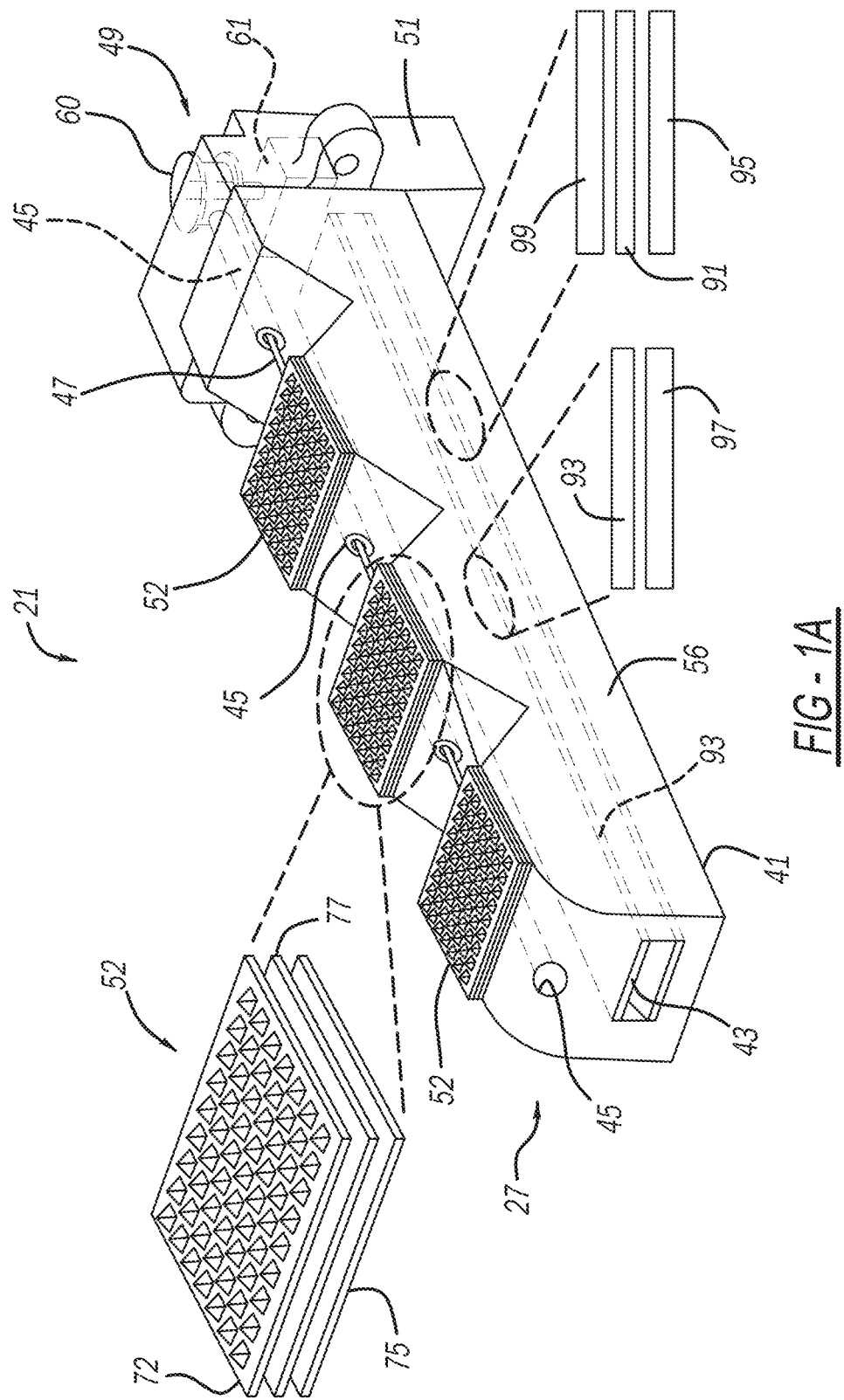
FIG. 1A is a partially exploded, perspective view showing a finger of the present soft gripper.

A preferred embodiment of the present soft gripper apparatus includes a smart soft finger-like actuator with a fast response, accurate control, self-powered pressure and bending sensing capability by combining cable-driven actuation with soft triboelectric nanogenerators. Referring to FIGS. 1A, 4A, 4B, 5A, 6A and 6B, the present soft gripper apparatus 21 includes a robotic arm 23, an extension bracket 26 extending from arm 23, and a mounting frame 25 to which are coupled multiple gripper fingers 27. A pivotable rod 29 and receptacle 31 centrally couple frame 25 to bracket 26 and engagement of a holder into a set from rows of threaded holes in frame 25 allow for adjusting grasp scope of the fingers (where the grasping diameter ranges from 32~82 mm by way of nonlimiting example).

Fingers are peripherally separated from each other by approximately 120°. Fingers 27 can be inwardly flexed and curved toward each other so as to grab and hold delicate workpieces therebetween such as fruit, vegetables, eggs, glass and the like. A tomato workpiece 33 is shown in the present example. Also, arm 23 may be mounted on a portable or stationary, articulated or boom style robot or the like.

Each finger 27 includes a longitudinally elongated body 41, TENG sensor 43, tubes 45, a cable 47, an actuator 49, a holder 51 and tribo-skins 52. Body 41 is preferably made of silicon rubber and split into multiple segments 53, preferably four, by three 45° triangular cuts 55, so as to facilitate its bending, and achieve a better enveloping profile and thus a conformal contact with workpiece objects of complex geometries. A good enveloping profile in grasping improves the handling stability and enhances pressure sensing and energy harvesting for the design of the present smart actuators. The adjacent segments 53 with 45° triangular cuts at their shoulders can thereby provide a 90° angular displacement when bent. Furthermore, a tip 56 of finger 27 has a fillet or leading curve 57 to resemble a smooth tip-like human finger for grasping.

An elongated cable 47 is inserted through coaxially aligned tubes 45, located within drilled holes in the elastomeric body, adjacent its inner bending side. Tube 45 is made from PVC polymer by way of example and cable 47 is preferably made from a Nylon polymer. Moreover, an enlarged distal end 58 of cable 47 extends outside of and abuts against tip 56 of finger 27. Oppositely, a proximal end 59 of cable 47 connected to a spindle 60 rotatably driven by a miniature DC electric motor 61 (6 V and 90 rpm) of actuator 49, coupled thereto through an output shaft 63. Thus, energization of motor 61 longitudinally pushes (lengthens) and pulls (shorten) cable 47 through tubes 45 in order to constrictably bend or relaxably straighten finger 27. Motor 61 is mounted on holder 51. Tube 45 serves to protect the body of actuator and reduce potential friction of the cable moving within the finger.

Two types of TENG sensors are integrated with each finger 27: single-electrode-mode TENG sensors 52 to measure contact pressure, and inner contact-separation-mode TENG sensor 43 to detect bending. TENG sensors 52, also referred to herein as tribo-skin patches, are patterned with surface discontinuities such as micro-pyramid structures 71 (see FIGS. 1A, 1E and 1F) laterally projecting from a generally flat external layer 72 toward an apparatus centerline 73, to improve their sensing and harvesting performance. External layer 72 and a generally parallel and flat internal layer 75 of each TENG sensor 52 are preferably made from a very soft and pliable Ecoflex brand platinum-catalyzed silicone rubber elastomer, which has a shore hardness of 00-30, a tensile strength of 200 psi, 100% modulus of 10, psi and 900% elongation at break. An intermediate layer 77, sandwiched between layers 72 and 75, is preferably conductive metallic, Silver nanowires (Ag-NWs). Each TENG sensor 52 preferably has a rectangular periphery with a longitudinal length of at least 10 mm, and more preferably approximately 20 mm, and a lateral width of at least 10 mm, and more preferably approximately 24 mm, for a total longitudinal finger length of at least 100 mm, and more preferably approximately 142 mm. There are at least five rows and five columns of pyramids 71 on exterior layer 72, and more preferably seven rows and nine columns, by way of nonlimiting example.

Tribo-skin patches 52 act to make the soft gripper apparatus smart. The tribo-skin patches are each a rubber-based TENG patch attached to the phalanx surface of finger segments 53, and they can generate electrical energy when finger 27 contacts external workpiece objects. Due to the change of the output voltage with the variation of the contact area under different forces, TENG sensors 52 serve as a pressure sensor with high sensitivity.

Figure 4A:
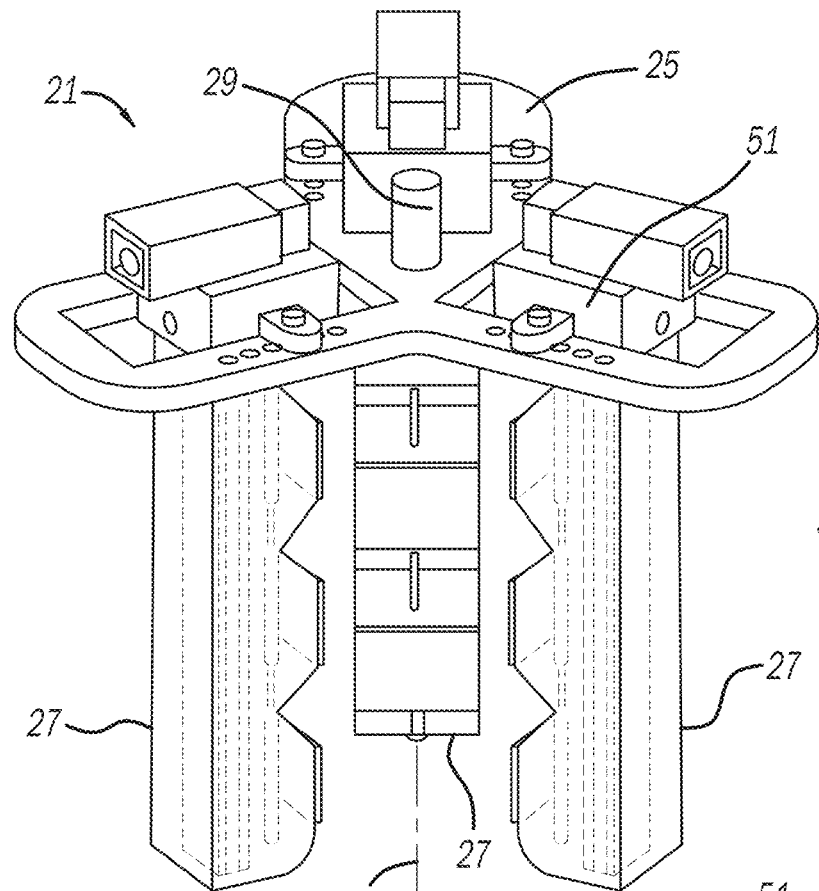
FIG. 4A is a perspective view showing the present soft gripper.
Figure 4B:
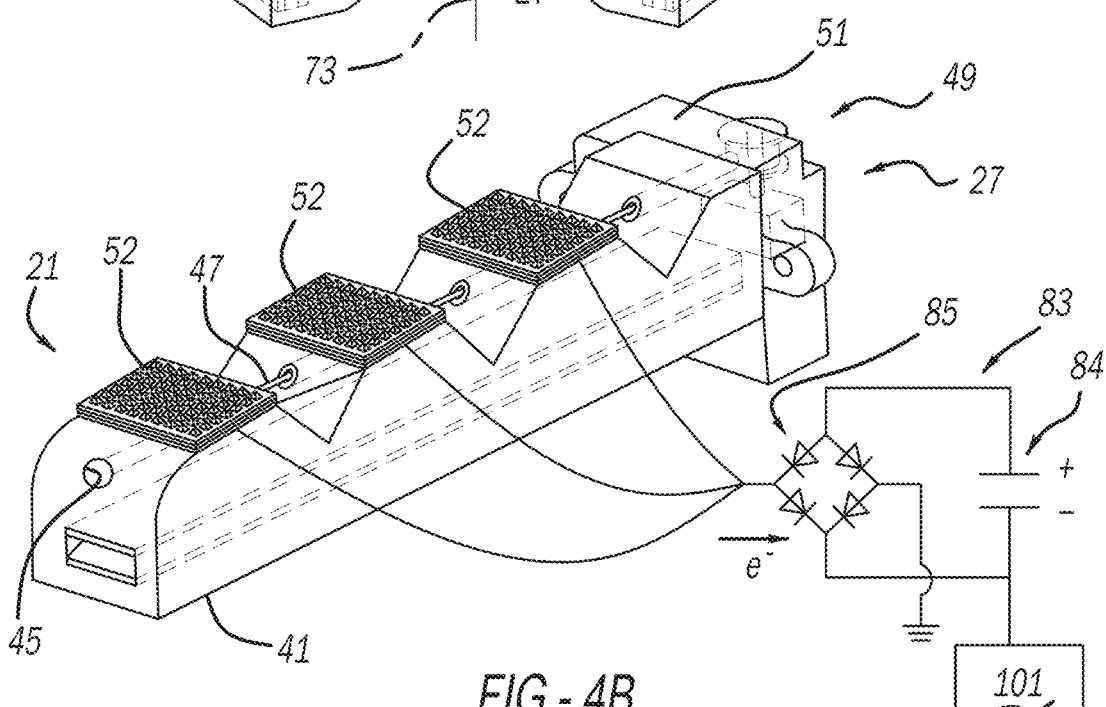
FIG. 4B is a perspective view showing the finger and an electrical circuit diagram of the present soft gripper.
Figure 4C:
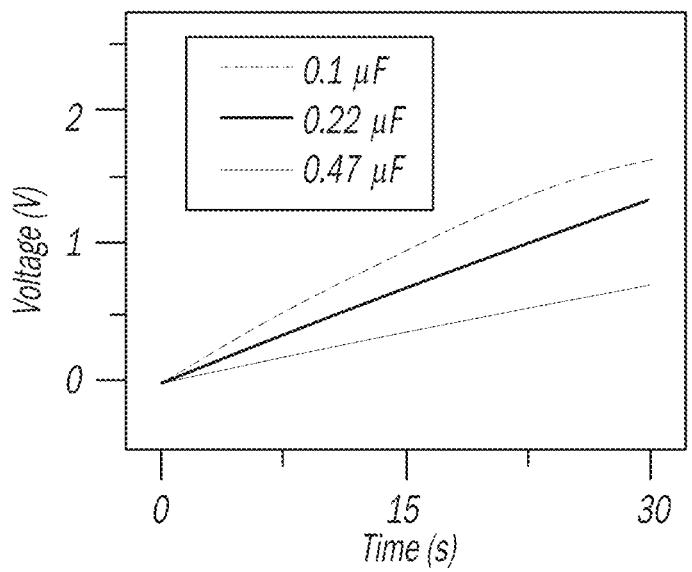
FIG. 4C is a graph showing voltage versus time of the TENG employed in the finger of the present soft gripper, measuring a charging process of the soft gripper under repetitive grasping and expanding positions by employing different capacitances.

As can be observed in FIG. 4B, tribo-skin patches 52 are connected to an electrical circuit 83 including a capacitor 84 via a rectifier 85 to store the electricity energy generated during repeated grasping and separating processes. Through repeated bending of the finger actuator, the voltage of the capacitor (0.1 µF) will gradually increase and reach 1.6 V after 30 s (see FIG. 4C). The charged capacitor could be further utilized as a power source to drive other sensors, additional electronics or batteries. Circuit 83 is electrically connected to a programmable microprocessor controller which operably receives the output signals for the TENGs and energizes or deenergizes actuator 49 accordingly to automatically control the grasping, holding and releasing functions of fingers 27 in a real-time, closed loop manner. The output voltage generated by the TENGs can be used to monitor and record the states of the soft fingers in various applications, such as contact force, bending degree, shape profiles and relative weights of contact objects, and in the meantime, the harvested electricity energy can also be stored in a capacitor for powering other sensors and electronics as a power source.

It is notable that the present cable 47 possesses a high tensile strength but low or zero bending stiffness (i.e., is highly flexible), and cable-driven actuation exhibits great advantages in fast speed and simple control. In addition, the actuation force, generated via motor 61 and applied through the cable, can be delivered along the whole body 56 to a target point (i.e., end effector) to minimize the inertia of the robotic arm and/or gripper. Based on the performance of the motors adopted, the present cable-driven fingers and gripper are beneficially lightweight, have a fast response, and achieve a large output force.

Figure 6A:
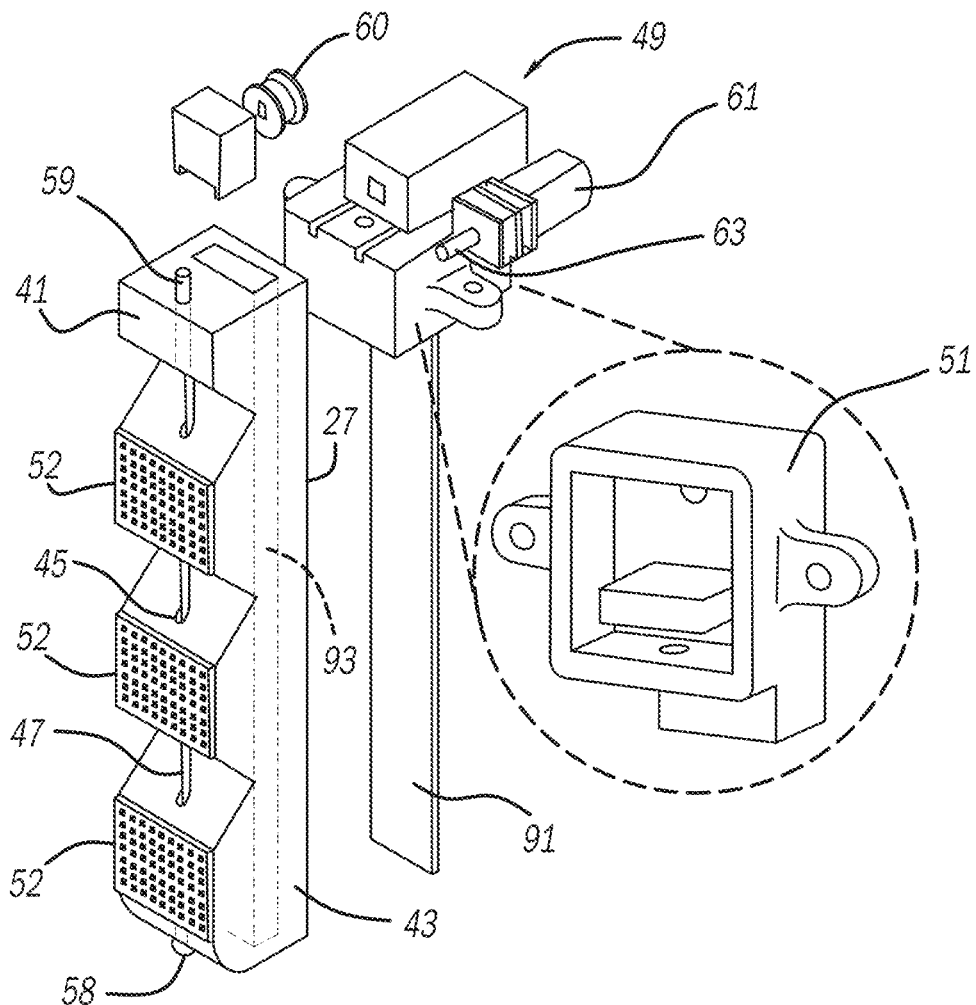
FIG. 6A is a partially exploded perspective view showing the finger of the present soft gripper.
Figure 6B:
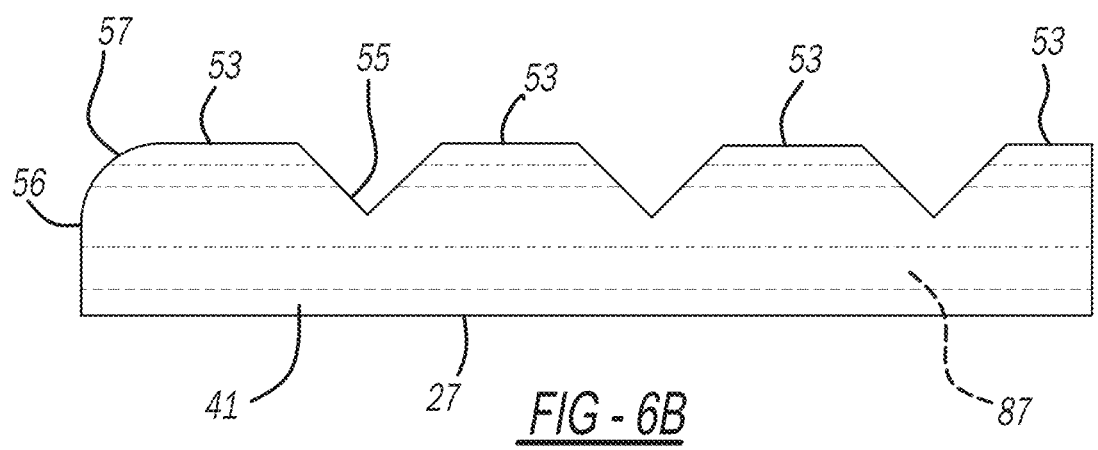
FIG. 6B is a side elevational view showing the finger of the present soft gripper.

Referring now to FIGS. 1A, 6A and 6B, TENG 43 acts as a laterally bendable and flexible skeleton or substrate, and is encapsulated internally within a cavity chamber 87 of each finger 27. Inner TENG sensor 43 includes two separated and longitudinally elongated, conductive metal strips: (a) conductive strip 93 that is connected to holder 51 with the tip end and (b) conductive strip 91 that is entirely bonded to the inner surface of chamber 87 substantially encapsulated and surrounded by body 56. Conductive strips 91 and 93 are preferably copper or an alloy thereof. PET polymeric insulator strips 95 and 97 are adjacent outside surfaces of conductive strips 91 and 93, respectively, while a PTFE polymeric strip 99 is located adjacent an inside surface of conductive strip 91. PTFE strip 99 provides insulating and friction-reducing functionality.

Turning now to FIGS. 1A and 2A-2D, when motor 61 rotates to pull cable 47, the soft actuated finger 27 will bend inward (the side with the notches) to the degree specified by the controller. When the soft finger bends, conductive strip 93 is free from the deformation of the finger due to the boundary condition mentioned above while conductive strip 91 can curve together with body 56 and thus touches with conductive strip 93, resulting in a touched bending of conductive strip 93. The increased bending of the finger leads to an increased contact area between the conductive strips, which in turn produce more electricity due to a tribo-electrification effect.

In other words, the inner TENG with two conductive strips 91 and 93 placed in a back section of the actuated finger 27 works based on the contact-separation mode of tribo-electrification effect. The two strips, conductive strip 93, fixed onto holder 51, and conductive strip 91, bonded to the chamber surface 87, are in contact when soft finger 27 bends under actuation. Since the two strips have different boundary conditions, 91 will deform together with the soft finger following an equal bending degree. The contact area will increase with further bending of the actuated finger, making conductive strip 93 positively charged and PTFE layer 99, adjacent conductive strip 91, being negatively charged, according to the triboelectric theory. When the soft finger returns to its original shape, the contacted surfaces separate apart with electrons flowing from conductive strip 91 to conductive strip 93 to neutralize the positive charges triggered by triboelectricity. Electrons keep flowing until the finger becomes substantially straight. Furthermore, when the finger is bent again, an inverse electron flow can be generated between the TENG strips. The voltage signal increases with the bending degree of the finger actuator (see FIG. 2B) and is thus utilized for characterizing and measuring bending profile characteristics of the finger, the output signal being received by a programmable computer controller or microprocessor 101 (see FIG. 4B) via circuit 83. On the other hand, the measured wavelength of the voltage can be employed to determine bending frequency characteristics of the finger by the controller. Therefore, from this inner TENG sensor, the programmable computer controller or microprocessor 101 automatically and quantitatively determines the characteristics of curvature of the soft actuated finger 27 and its associated bending profile and speed characteristics.

Figure 2A:
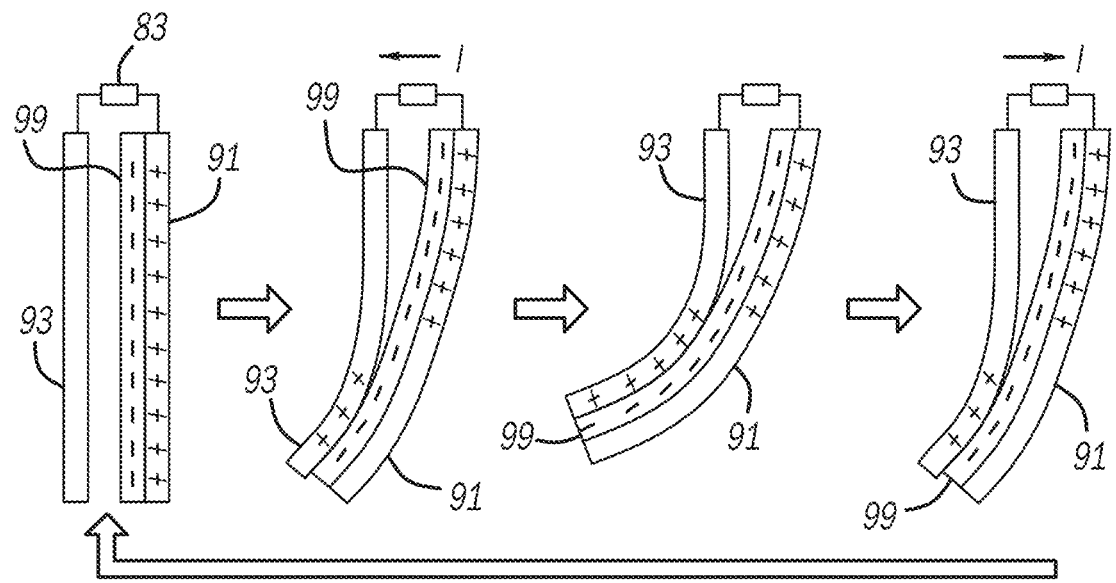
FIG. 2A is a series of diagrammatic side views showing a triboelectric nanogenerator ("TENG") coupled to the finger of the present soft gripper, in different operating positions.
Figure 2C:
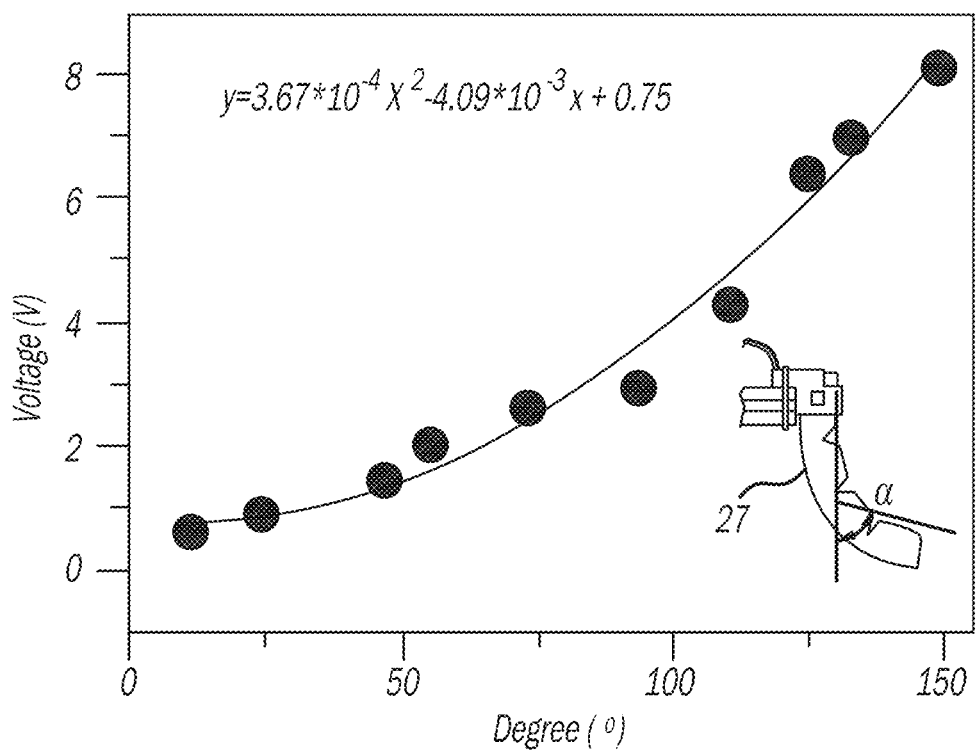
FIG. 2C is a graph showing peak voltages induced from the TENG for different bending finger positions of the present soft gripper.
Figure 2B:
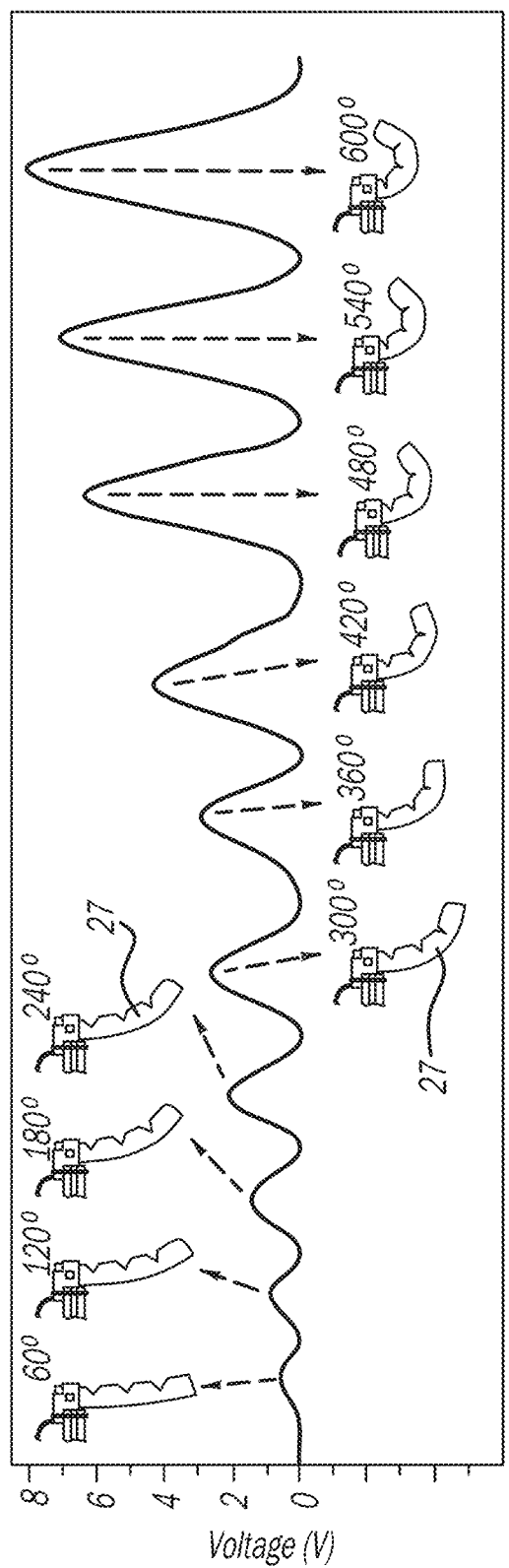
FIG. 2B is a graph showing output voltages generated by the TENG for different bending finger positions of the present soft gripper.
Figure 2D:
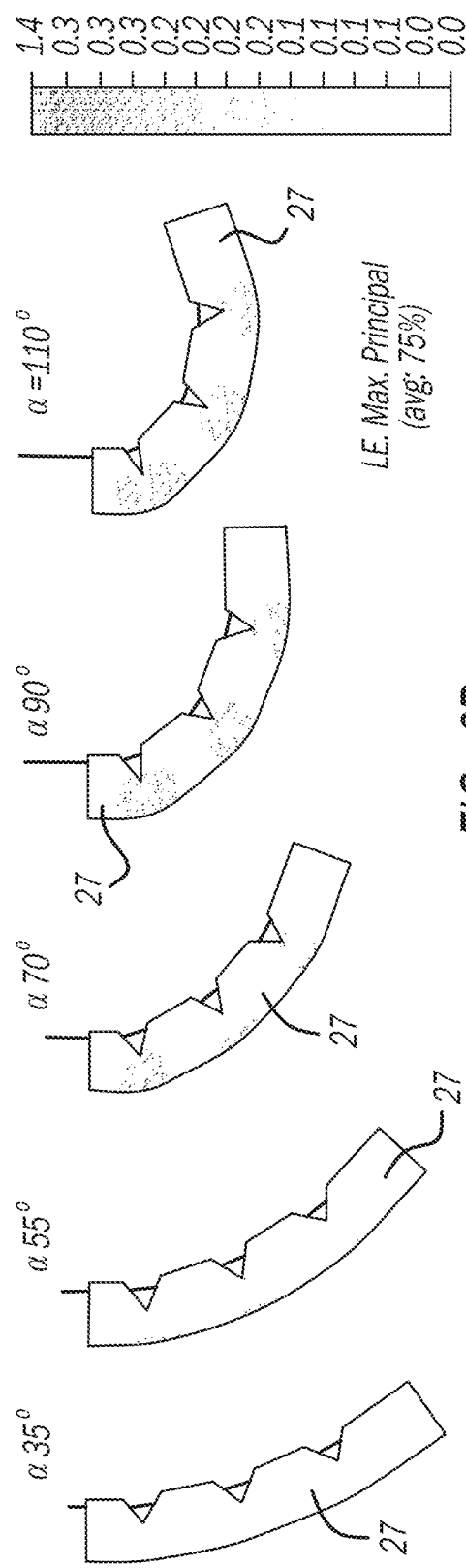
FIG. 2D is series of diagrammatic side views showing FEM simulations of stress distributions for different bending finger positions of the present soft gripper.
Figure 8:
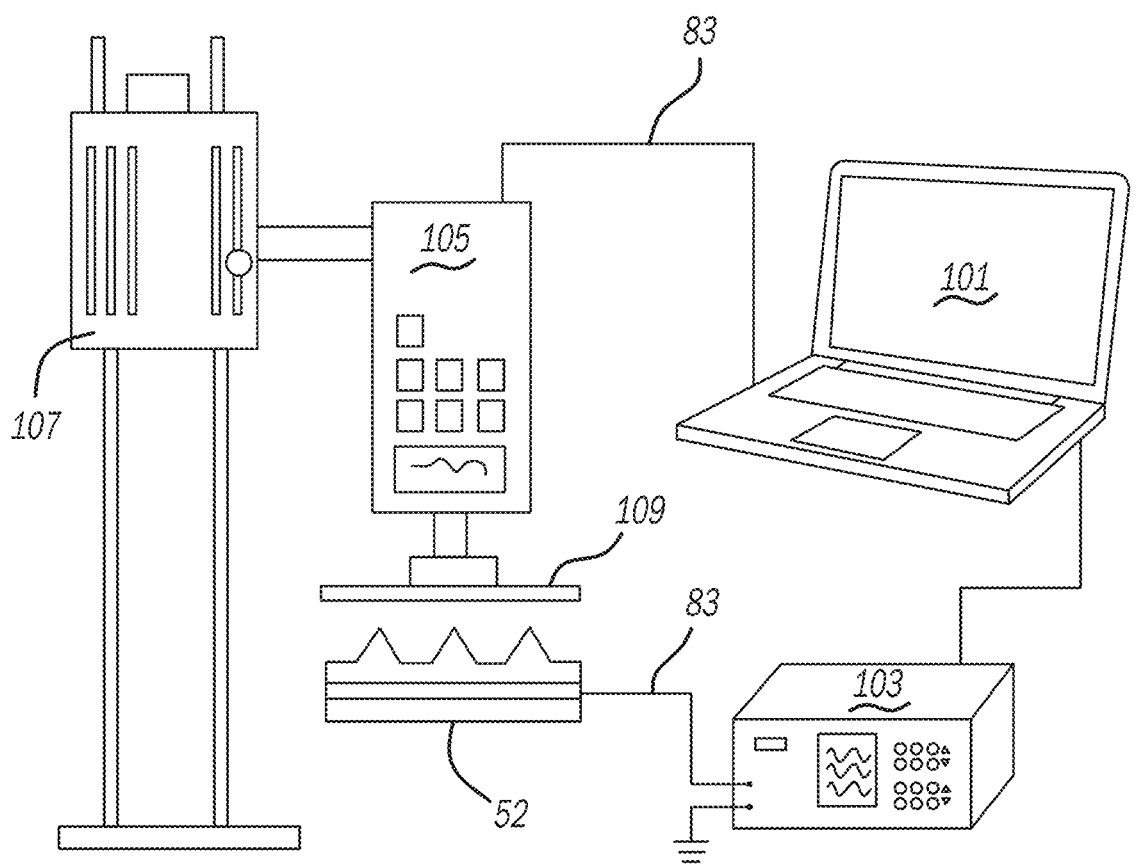
FIG. 8 is a diagrammatic view of electrical components used to experimentally measure performance of the TENG employed in the present soft gripper.

The measured characteristics of finger 27, as sensed by TENG strips 91 and 93, can be tested with reference to FIG. 2B and FIG. 8. To characterize the performance of the smart soft finger, the relationship can be experimentally measured between the voltage produced by the inner TENG and the bending angles of the soft finger. Output voltages, currents and transferred charges can be measured by a current preamplifier (e.g., such as a Keithley 6514 system electrometer 103), and LabVIEW software is programmed to collect the real-time data in the bending process. The actuator motor, having an encoder, is controlled by an Arduino® UNO microcontroller board inside controller 101 to perform a two-way rotation with specific angular displacements. A rotational motor (not shown) is programmed to rotate to a degree (i.e., 60°, 120°, 180° . . . 600°) and then rotates back immediately. The generated voltage from the inner TENG is recorded by electrometer 103.

FIG. 2B presents the open-circuit voltage vs. the corresponding rotation angles of the motor. With constant rotational speed of the motor, bending the finger to a larger degree needs a longer time, which is observed from an increased wave width of a voltage pulse towards the right end of the FIG. 2B. Meanwhile, it can be seen that the larger bending degree of the finger generates a higher voltage magnitude, indicating that the voltage signal can be detected and analyzed for reporting the bending degree and bending profile. A peak voltage of 8 V can be obtained from the inner TENG when the soft finger is bent and when the motor rotates by 600°. Based on the shape of the finger with the three phalange segments separated by notches and the fact of tip phalanx segment providing the most supporting forces in the majority of cases, the angle $\alpha$ between an intersection of contour lines of the first and last phalange segments of the finger is selected to describe a motion profile, which is used to relate with the peak value of the voltage induced by the inner TENG as is illustrated in FIG. 2C.

Figure 3A:
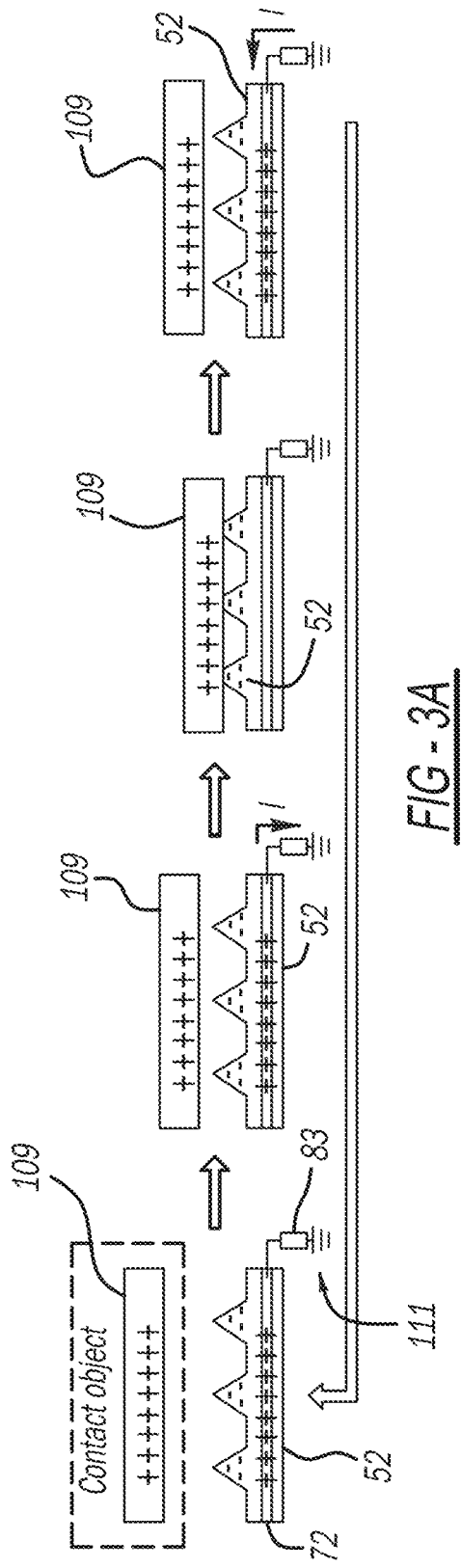
FIG. 3A is a series of diagrammatic side views showing the TENG employed in the finger of the present soft gripper, in different operating conditions.

Soft tribo-skin 52 on each finger segment enhances the multifunctionality of the present soft gripper apparatus, which is capable of sensing contact force and harvesting energy in the actuation operations. To evaluate the performance of energy-harvesting and sensing of soft tribo-skin 52 under different working conditions, a test setup is used as shown in FIG. 8. A force gauge 105 is assembled with a linear motor 107 (LinMot MBT-37×120). A glass slide 109 is bonded to the tip of the force gauge to allow full-face contact. The linear motor can be precisely adjusted in terms of speed, acceleration and displacement amplitude, and for testing, periodically impacts the tribo-skin patch. FIG. 3A illustrates a working principle of tribo-skin patch 52 based on the single-electrode mode. When a dielectric object or workpiece 109 (e.g., glass slide) approaches the tribo-skin patch, the electrons will be inducted from an electrical ground 111 to AgNW electrode 77 due to an electrostatic induction effect, inducing electrical currents in circuit 83. Charge neutralization occurs and electrons stop moving when the object is in contact with the tribo-skin. When the two surfaces oppositely charged are separated, the potential difference between the AgNW electrode and the ground is induced, prompting the flow of electrons and generating electrical current in the circuit. When the contact object is quite far away from the tribo-skin, a new electrical equilibrium is established.

Figure 3B:
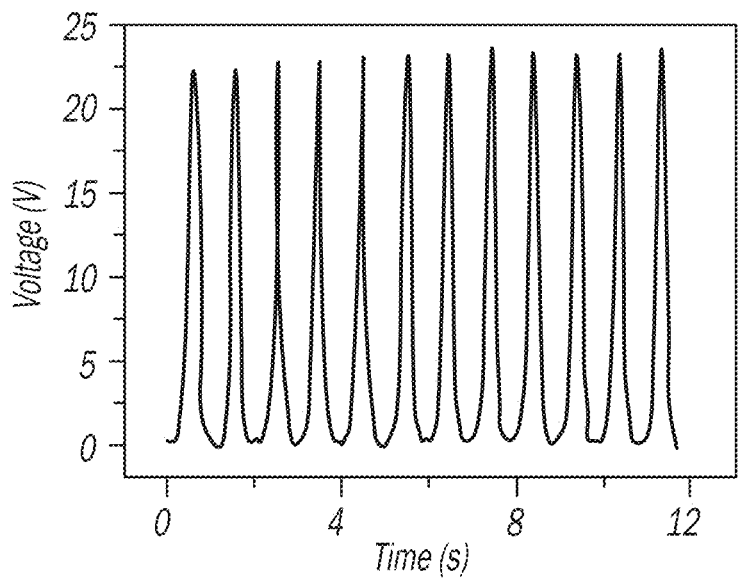
FIG. 3B is a graph showing open-circuit voltage versus time of the TENG employed in the finger of the present soft gripper.
Figure 3C:
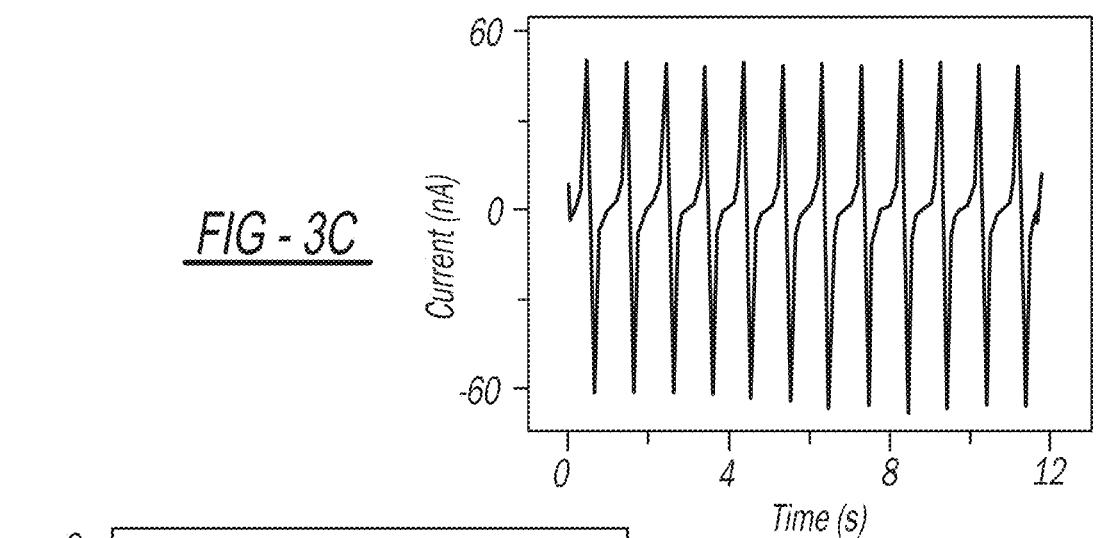
FIG. 3C is a graph showing current versus time of the TENG employed in the finger of the present soft gripper.
Figure 3D:
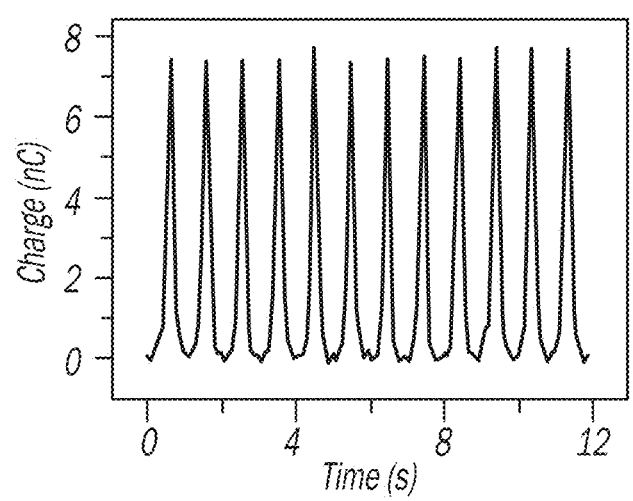
FIG. 3D is a graph showing transferred charge versus time of the TENG employed in the finger of the present soft gripper.
Figure 3E:
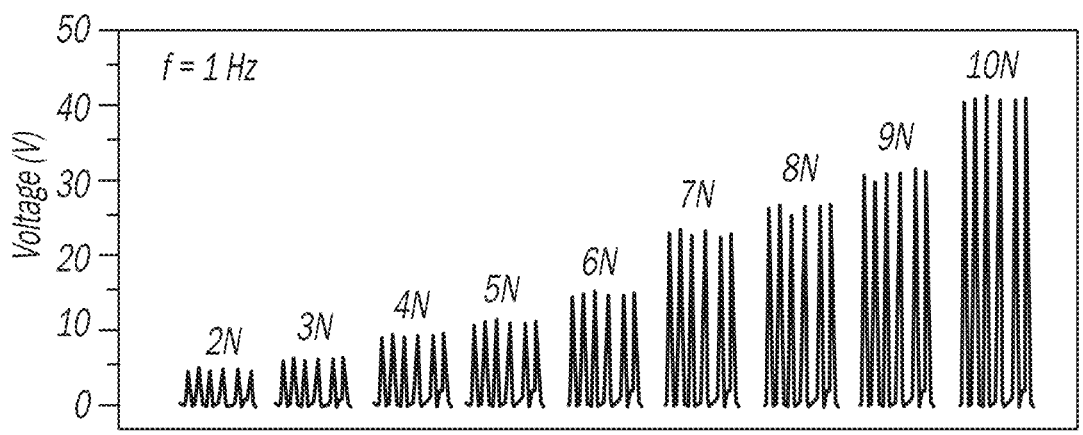
FIG. 3E is a graph showing open-circuit voltage versus force of the TENG employed in the finger of the present soft gripper.
Figure 3F:
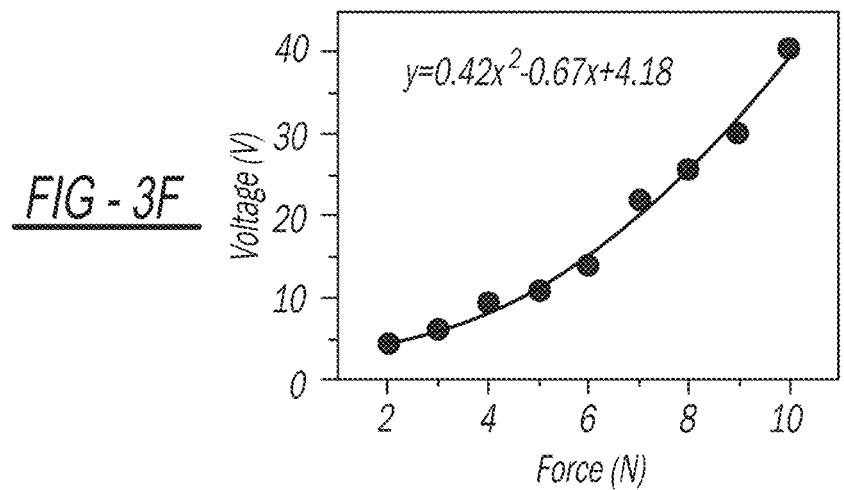
FIG. 3F is a graph showing peak voltage versus force of the TENG employed in the finger of the present soft gripper.

Tribo-skin patch 52 serves as a pressure sensor after the relationship is calibrated between the open-circuit voltage and the amplitude of the contact force. FIGS. 3B-D demonstrate the expected real-time signals of voltage, current and charge induced by the tribo-skin under an applied contact force with a magnitude of 8 N and a frequency of 1 Hz. The open-circuit voltage should achieve a peak value of about 23 V in average, the current induced should be about 50-60 nA, and the transferred charge is expected to be about 7.5 nC. When the contact force with a frequency of 1 Hz increases from 2 to 10 N with increments of 1 V, the open-circuit voltage should be enhanced from 4.8 to 41 V (FIG. 3E). However, further increase in the contact force (>10 N) will not change the output anymore, indicating the sensing limit of this tribo-skin. FIG. 3F shows a calibration curve fitted with the expected data of the peak output voltage and the amplitude of the applied force. Because of the micro-pyramid pattern on this tribo-skin patch, the voltage shows a nonlinear relationship with the applied contact force, indicating that a smaller force can generate a larger electric output, benefiting its sensing and harvesting capacities.

Figure 3G:
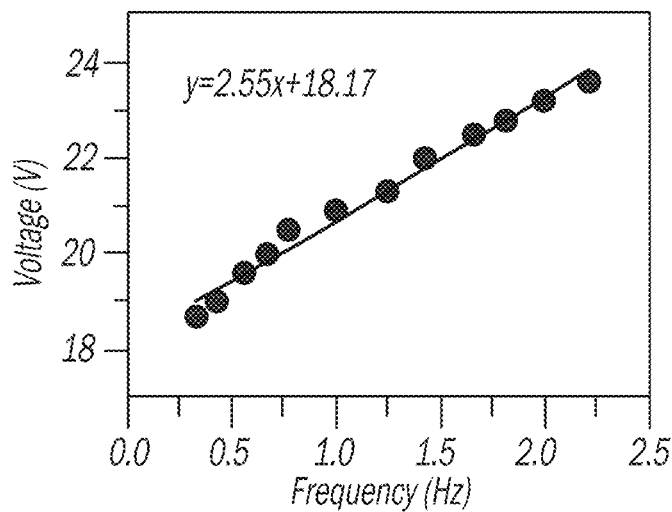
FIG. 3G is a graph showing output voltage versus contract frequency of the TENG employed in the finger of the present soft gripper.
Figure 3H:
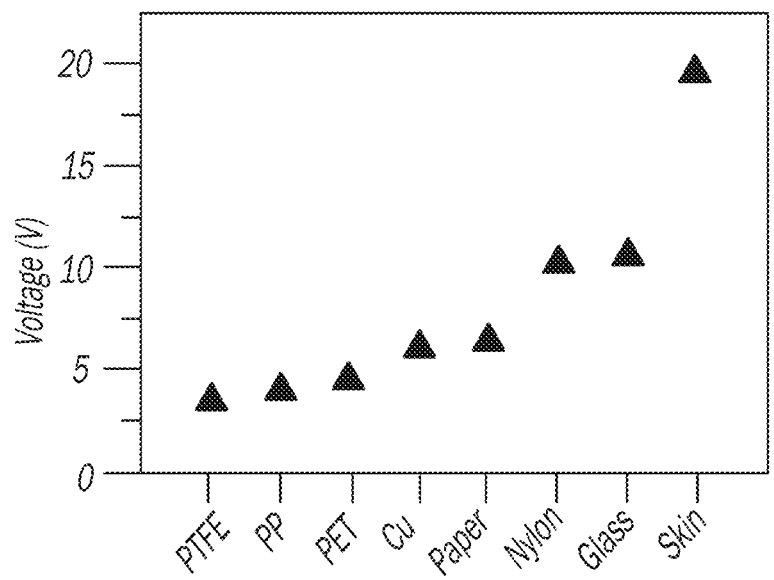
FIG. 3H is a graph showing output voltage performance for the TENG employed in the finger of the present soft gripper when used with different workpiece materials.
Figure 3I:
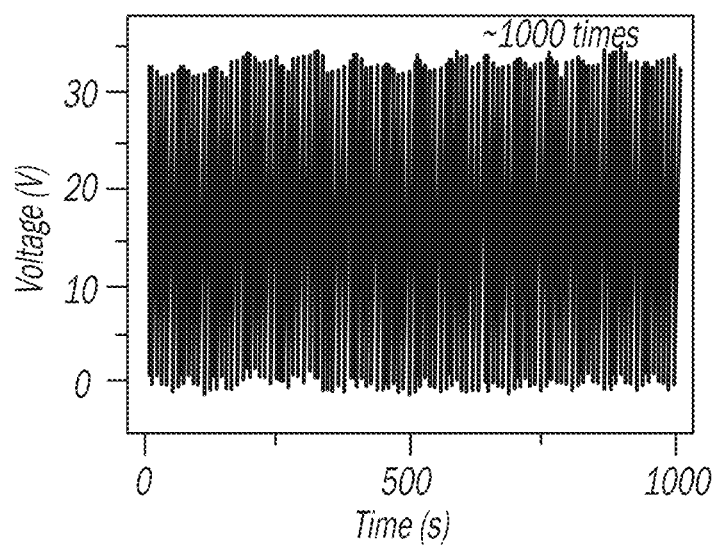
FIG. 3I is a graph showing voltage versus time of the TENG employed in the finger of the present soft gripper, measuring stability and robustness of the tribo-skin patch with 1000 contact-separation cycles.

Contact frequency and contact material are two other factors that influence the electrical outputs of the tribo-skin. FIG. 3G shows an expected peak value of the open-circuit voltage as a function of contact frequency under an applied force of 7 N. It is noticed that the peak voltage is enhanced from 18.7 V to 23.6 V as the frequency increases from 0.3 Hz to 2.2 Hz. As illustrated in FIG. 3H, the voltage output produced from the present tribo-skin sensor varies with the types of object materials. It is observed that under the same amplitude (5 N) and frequency (1 Hz) of the contacts, human skin, glass and paper should be able to generate higher output voltage. Furthermore, the robustness and stability of the tribo-skin patch may be tested under repeated contact controlled by the linear motor (at 1 Hz). Within 1000 times of contact-separation cycles in about 16.6 mins, the peak value of the open-circuit voltage should remain stable, as can be seen in FIG. 3I. Therefore, the tribo-skin can serve as a stable force sensor as well as an energy harvester.

Figure 4D:
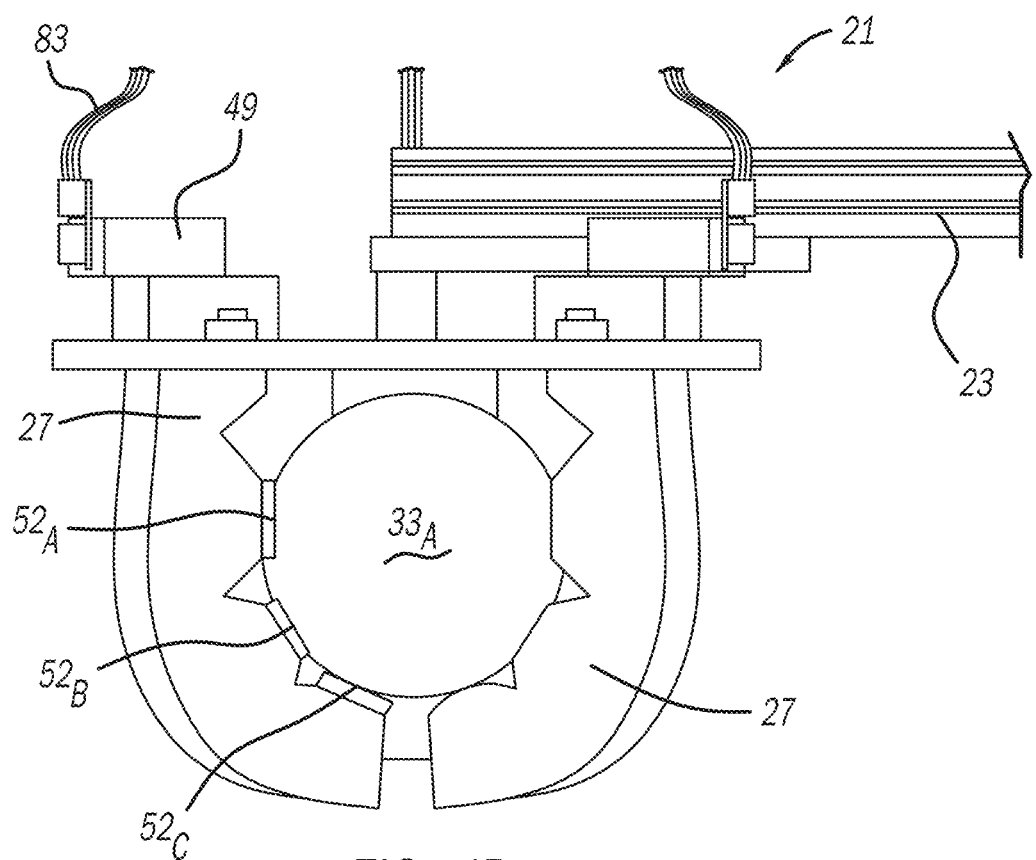
FIG. 4D is a side elevational view showing the present soft gripper grasping a polymeric ball workpiece.
Figure 4E:
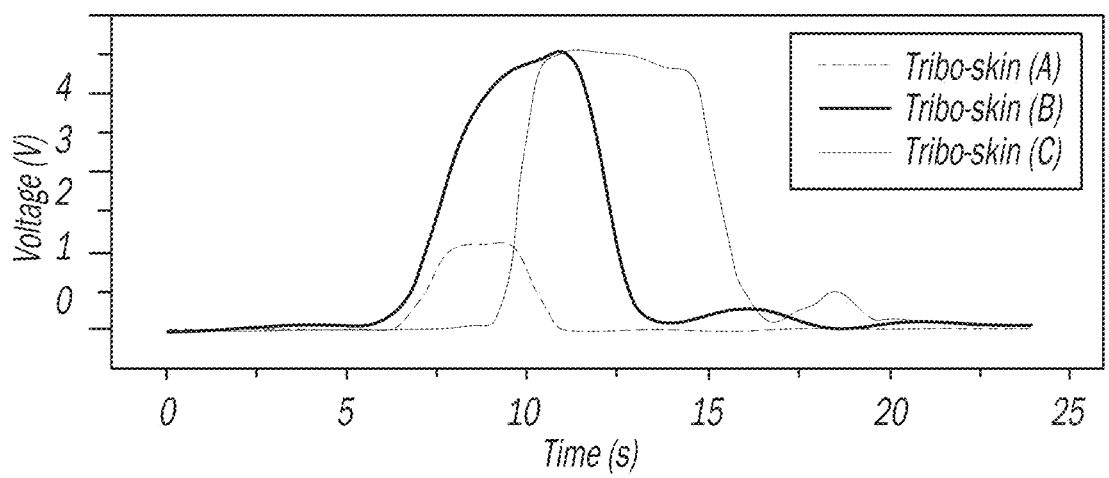
FIG. 4E is a graph showing voltage versus time measured from three of the tribo-skins on the single finger of the present soft gripper of FIG. 4D, including contact and squeeze, grasp, expand and drop, and secondary impact conditions.

The sensing capability of the gripper may be evaluated by grasping two different objects or workpieces, including an acrylic spherical shell 33A and a polylactic acid (PLA) hexagonal prism 33B. Considering symmetric geometries of the objects, only the voltage signals from the TENG devices (three tribo-skins 52 and inner TENG 91/93) in a single actuator are considered for this example. FIG. 4D shows smart gripper apparatus 21 grasping spherical shell workpiece $33_A$. When soft fingers 27 bend and approach the spherical ball, tribo-skin sensor $52_B$ will first contact with the ball and followed by $52_A$, and finally $52_C$. The relative position and size of the workpiece object with the gripper may affect or change this contact sequence. The real-time output voltages expected from tribo-skins $52_{A-C}$, in a single finger 27, are plotted in FIG. 4E. It can be observed that $52_A$ and $52_B$ are the two patches that are first in contact with shell 33A while $52_C$ and $52_B$ provide larger forces, reflected by a higher voltage level. When the tribo-skins 52 keep squeezing the object further, the voltage signals will increase to maximum values, and after that, the signals maintain almost constant during grasping and holding.

Figure 4F:
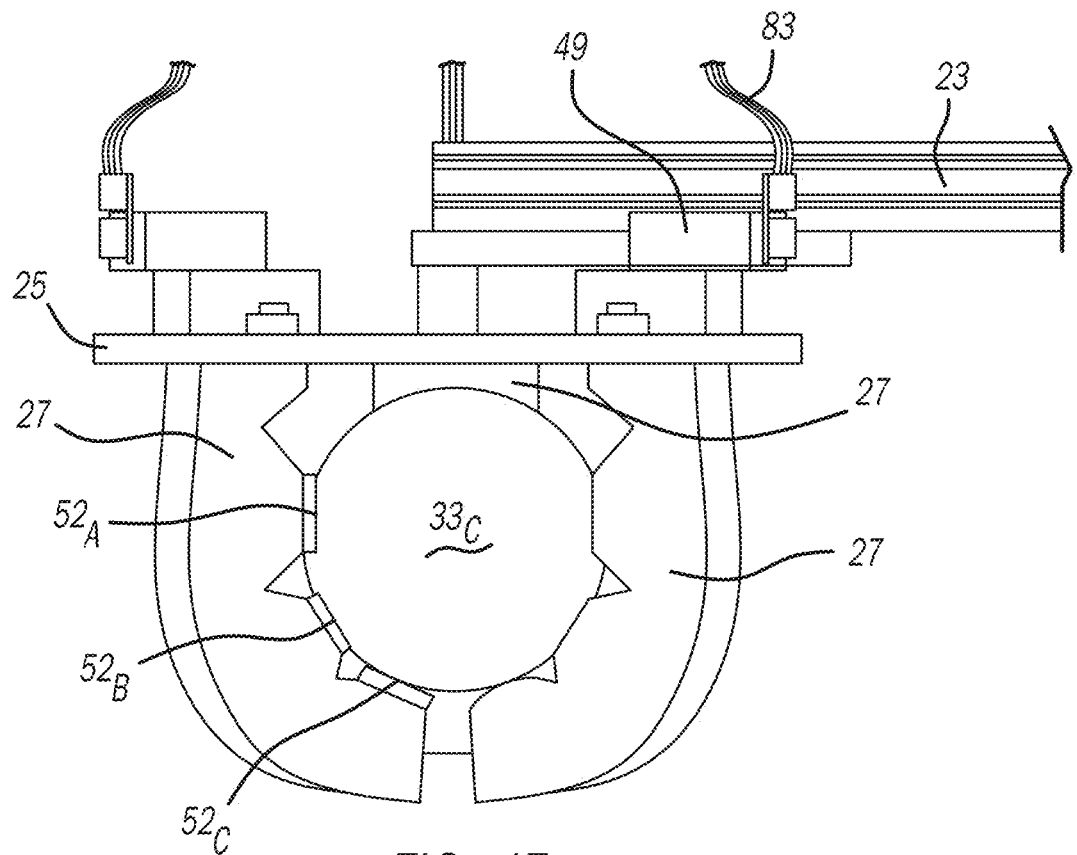
FIG. 4F is a side elevational view showing the present soft gripper grasping a polymeric ball workpiece that is heavier than that of FIG. 4D.
Figure 4G:
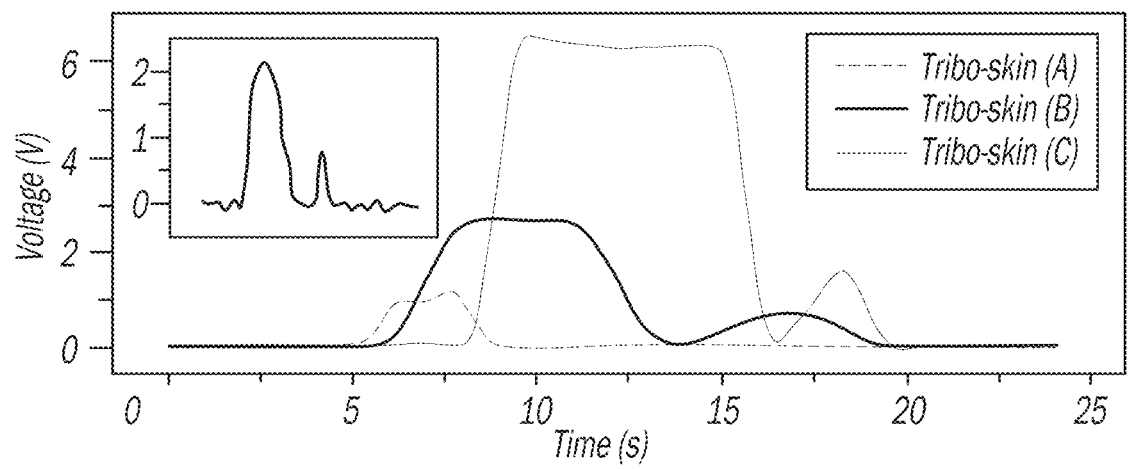
FIG. 4G is a graph showing voltage versus time measured from three of the tribo-skins on the single finger of the present soft gripper of FIG. 4F, including contact and squeeze, grasp, expand and drop, and secondary impact conditions, with the inset illustrating voltage of the TENG.

In addition, it is found that when tribo-skin sensor $52_C$ contacts the object, $52_A$ no longer provides supporting force, which is indicated by the vanished voltage. A possible reason is that the last phalanx lifts up the ball and pushes it against the gripper stand, resulting in a gap between the object and the tribo-skin. When the gripper suddenly drops the shell, voltages induced by TS-2 and TS-3 vanish quickly, indicting separations between the object and the tribo-skins. FIGS. 4F and 4G illustrate that for a heavier workpiece object $33_C$ of the same size and shape, the contact sequence of the tribo-skins $52_{A-C}$ does not change. However, the tip phalanx segment of finger 27, to which sensor $52_C$ is mounted, plays a more important role in lifting and grasping this heavier object with its peak output increasing to about 6 V. In addition, the voltage signal produced by $52_B$ becomes smaller when grasping and holding the heavier object. Besides larger peaks in FIGS. 4E and 4G, some tiny peaks are also induced from $52_B$ and $52_C$ after releasing object $33_C$, which result from the secondary contact between the object (of relatively large size) and the tribo-skins. It is noticed that when the shell $33_C$ falls off, the contact force between the falling object and sensor $52_C$ can produce a voltage peak of 1.6 V. Moreover, the real-time voltage expected from the inner TENG is also plotted as the inset in FIG. 4G. Hence, when soft finger 27 bends to fully grab and hold shell $33_C$, the voltage achieves its maximum, approximately 2 V, and the object falling will trigger a small signal due to secondary contact as well.

Figure 4H:
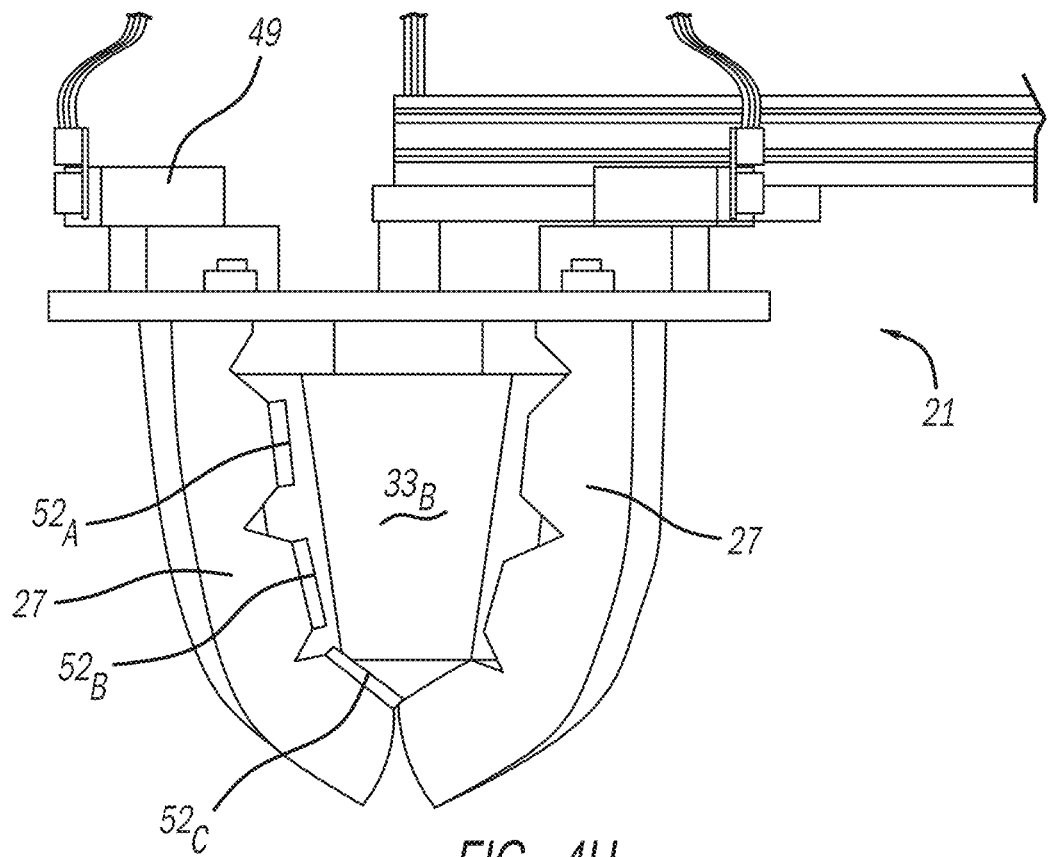
FIG. 4H is a side elevational view showing the present soft gripper grasping a polymeric and hexagonal prism workpiece.
Figure 4I:
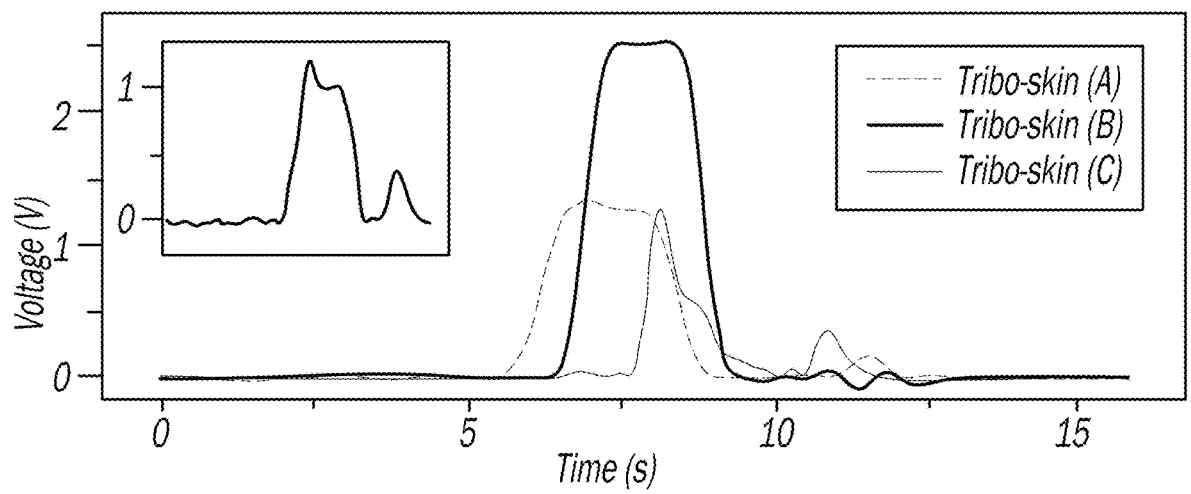
FIG. 4I is a graph showing voltage versus time measured from three of the tribo-skins on the single finger of the present soft gripper of FIG. 4H, including contact and squeeze, grasp, expand and drop, and secondary impact conditions, with the inset illustrating voltage of the TENG.

FIG. 4H shows hexagonal prism workpiece $33_B$ grasped by gripper 21 for a short time. Due to the difference in profile, the contact sequence for the tribo-skins 52 becomes $52_A > 52_B > 52_C$, as shown FIG. 4I. In addition, due to the smaller bottom of prism $33_B$, $52_C$ only touches the bottom edge of this object, thus the voltage signal should become smaller and sharp during grasping and holding, with a peak voltage of ~1.2 V. The signal from the inner TENG gives a peak voltage of 1.1 V, and by comparing the bending degrees of finger 27 to grasp these two different objects, it is observed that the actuated finger needs to bend more to wrap the shell $33_A$, which corresponds to a higher output induced from the inner TENG in FIG. 4G. These expected results illustrate that the actively generated signals enable the gripper to perceive different actions during grasping an object and to be aware of the dropping and any following contact of the object, indicating their use in automated grasping monitoring and feedback control as determined and controlled by the programmable controller.

Figure 5A:
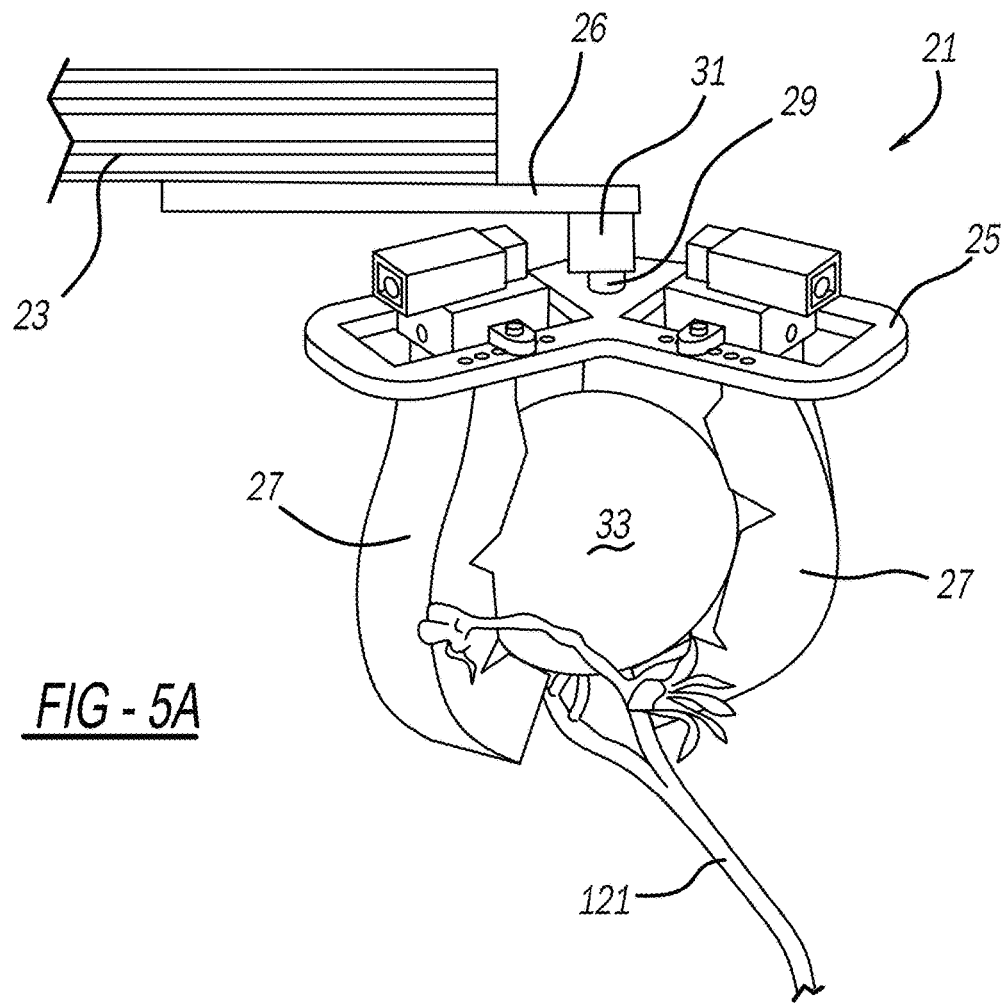
FIG. 5A is a perspective view showing the present soft gripper picking a tomato from a vine.
Figure 5B:
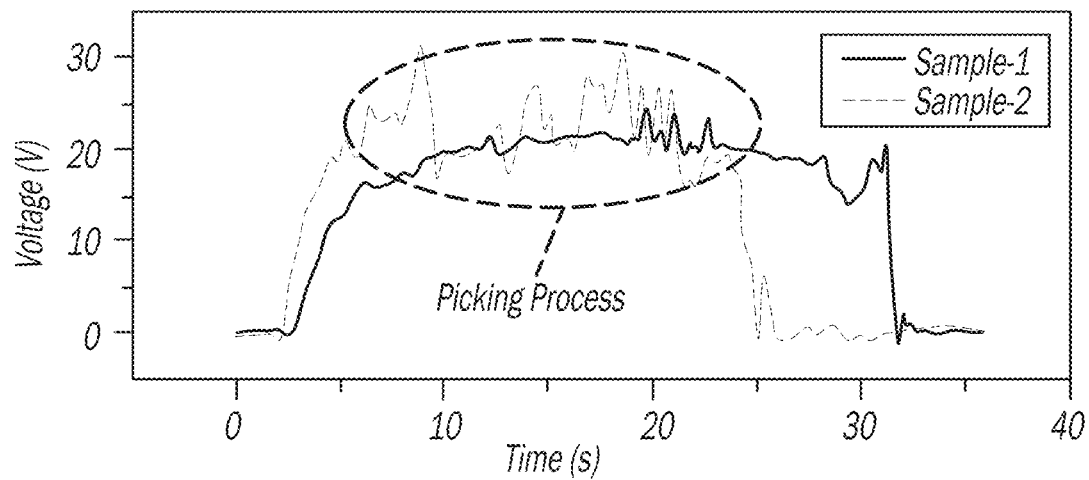
FIG. 5B is a graph showing voltage versus time of the present soft gripper, measured by all three of the tribo-skins (in series) of the tomato picking of FIG. 5A, including approach, grasp and holding, and release conditions.

Referring to the example of FIGS. 5A-D, the present gripper apparatus 21 is used for picking and grasping tomato workpieces 33 for potential agriculture harvesting applications. Because the gripper is fixed on frame 25, a vine stem 121 is held by hand to pull it down after the gripper fingers 27 grasps the tomato during the picking operation. It can be seen that as the force needed to pick the tomato off the stem may vary, two samples are prepared for analysis. Soft fingers 27 with an elastomeric material for body 41 which is stiffer than other versions discussed hereinabove, preferably Dragon Skin 10 (which can be obtained from Smooth-On, Inc., USA), is employed to enable grasping of heavier objects. FIG. 5B shows the expected output voltage generated by all the present exemplary tribo-skin sensors (connected in series) in a single finger. Different from the voltage presented in FIG. 4 for a separate tribo-skin, herein the output voltage gradually increases at the start until the gripper fully holds the tomato. In the picking process, the voltage signal fluctuates leading to some smaller peaks along the curves. Comparing the two picking up processes, it can be concluded that picking up tomato sample-1 is easier than picking up tomato sample-2, indicated by the smaller voltage and the uniform and tiny peaks along the curves. Therefore, the picking forces can be monitored by the programmable controller through the detected voltage signal in the grasping and holding operation during the picking process in agriculture product harvesting, for automated real-in control and adjustment of the actuator, and thereby, the finger grasping characteristics.

Figure 5C:
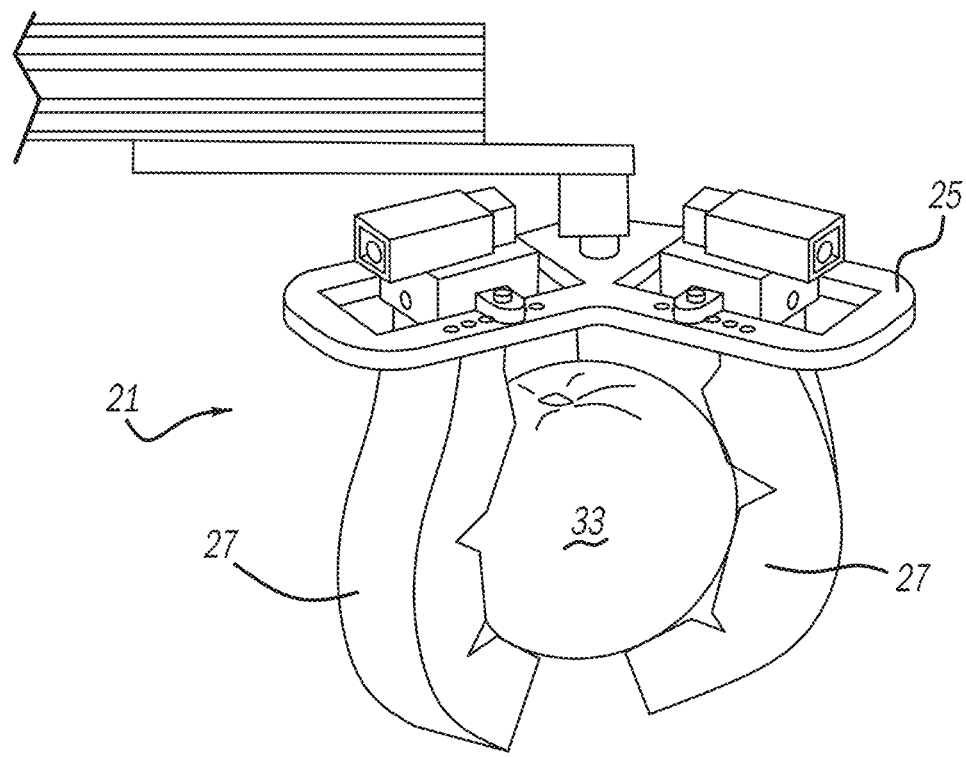
FIG. 5C is a perspective view showing the present soft gripper picking tomatoes of different weights.
Figure 5D:
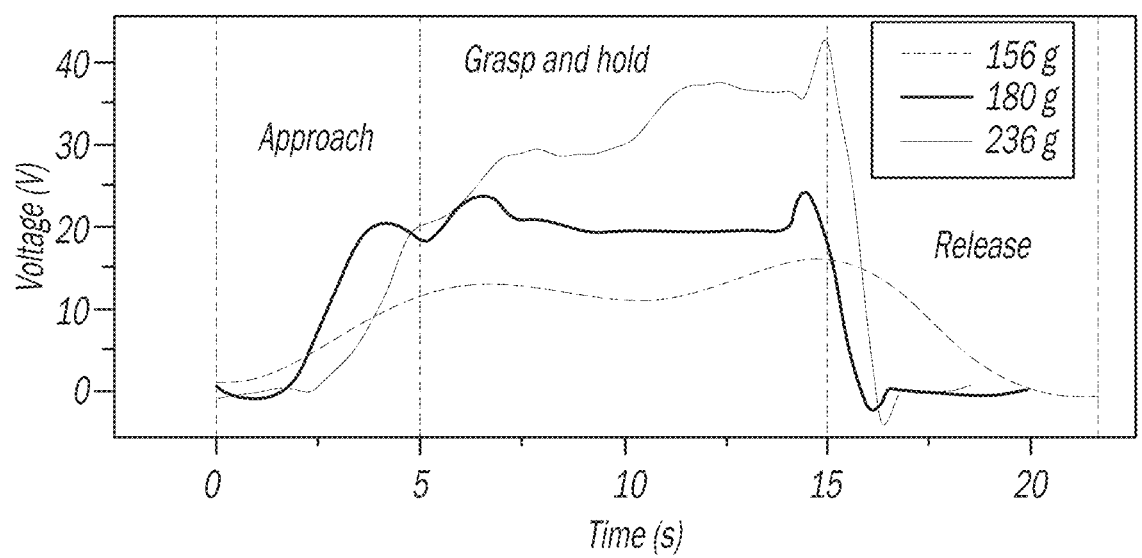
FIG. 5D is a graph showing voltage versus time of the present soft gripper, measured by all three of the tribo-skins (in series) of different weight tomato picking of FIG. 5C, including approach, grasp and holding, and release conditions.

The present soft gripper apparatus can report weight difference by analyzing the voltage signals generated by the tribo-skins. To further verify such a capability in harvesting, we use it to grasp three different tomatoes 33: 156 g, 180 g and 236 g (FIG. 5C). As shown in FIG. 5D, the voltage signals of grasping different tomatoes are changed with their weights. Although the slight difference in size may also marginally affect the voltage profile, voltage signals in the holding stage are mainly influenced by the weight of the tomatoes, which exhibits different levels for different weights. When finger 27 grabs the 156 g tomato, the total voltage induced by three tribo-skins in series at the grasping and holding stage should be around 11 V while for grasping a heavier one 180 g, it increases to about 20 V. It is observed that for the heaviest tomato, the output voltage increases to about 35 V. The possible reason is that this weight may be beyond the load capacity of the fabricated gripper which tends to prevent the dropping of such heavy object. For this prototype, the maximum weight it can grasp is around 500 g. Therefore, the proposed soft smart grippers are capable of measuring the contact force and bending degree, and detecting possible secondary contacts, picking force fluctuation and releasing/dropping behaviors. In addition, no matter whether the signal is recorded by separate or combined tribo-skins, it can be successfully utilized to identify the weight/mass difference.

In an industrial setting, the gripper apparatus has one or more of the elongated soft fingers coupled to a housing or base, containing the actuator(s), which is movably coupled by an actuated joint to an articulated or gantry arm 23 of a robotic machine. Such a robotic machine can be used as part of a pick-and-place assembly line, a food-sorting and processing station, or to harvest fruit or vegetables in an orchard or field. As previously discussed, electrical circuit 83 is connected to one or electric motor actuators 49, the TENG sensors and to computerized programmable controller 101 including a microprocessor and memory for operating programming instructions.

In summary, the present gripper apparatus includes a smart soft actuator with self-powered sensing tribo-skins through the integration of soft elastomers, a cable-driven mechanism and TENGs. Two different types of TENGs are equipped in the soft cable-driven actuators: the inner TENG based on the contact-separation mode that is able to generate voltage signals reflecting the bending degree of the actuated finger, and the tribo-skin patches that are patterned with micro-pyramids on surface and AgNW stretchable electrode that can sense contact pressure while harvesting energy through the single mode TENG design. The TENG-based sensors can be employed for monitoring the contact forces on objects, bending angles of the finger actuator and even relative weight and rough profile of the touched objects.

Alternately, the contact area of the tribo-skin may vary from partial to full surface in grasping due to the shape variation of grasped objects. To account for environmental variation factors, the TENG-based skin may have a contact-separation mode which can remove the influences from contact materials and other environmental factors like humidity. Furthermore, integration with techniques such as machine learning, the gripper may be able to identify different features (such as shape, hardness, etc.) of the grasped objects.

Figure 7:
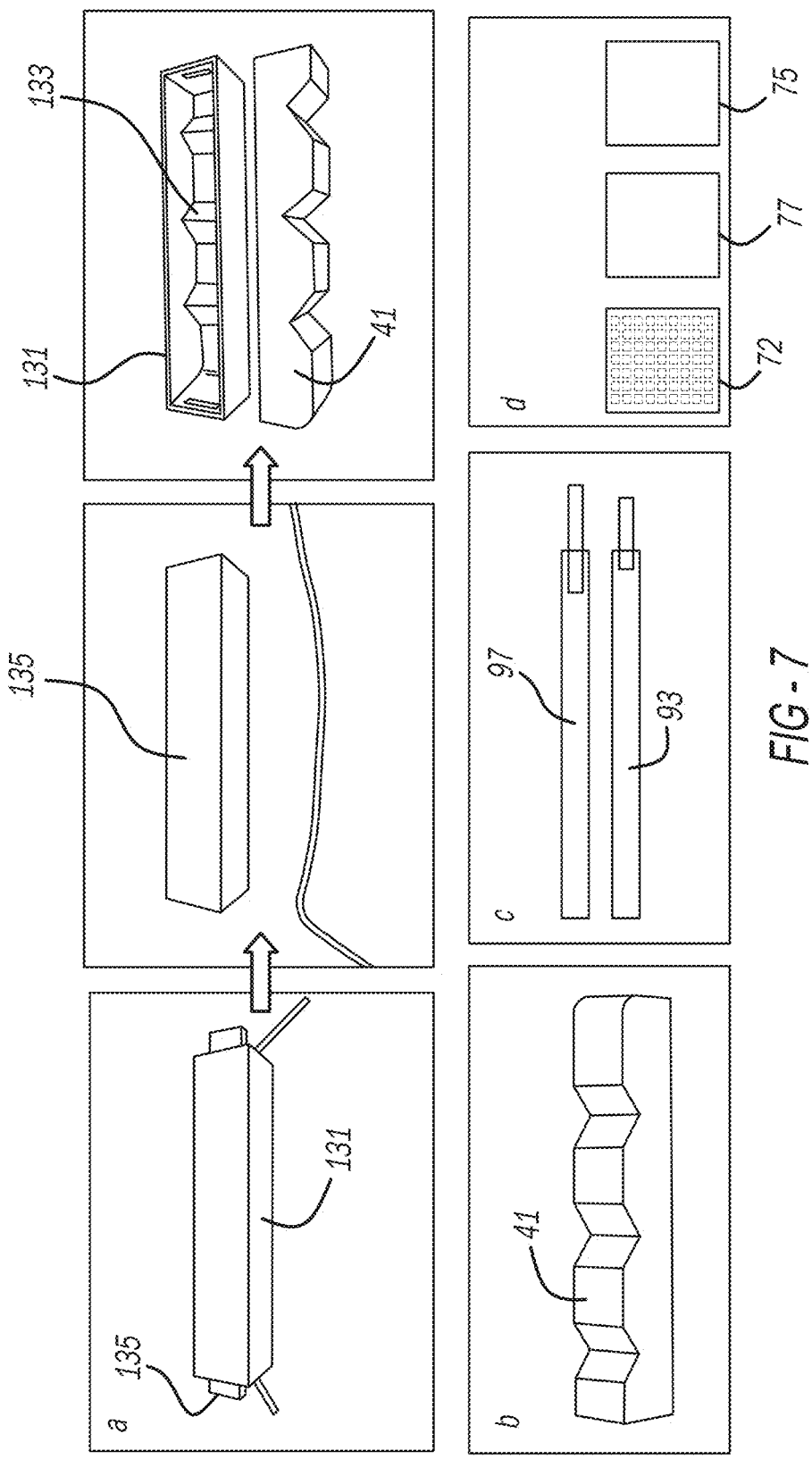
FIG. 7 is a series of diagrammatic views showing the fabrication process of the finger of the present soft gripper.

The manufacturing process will now be discussed hereinafter. FIGS. 1C and 7 show an exemplary and non-limiting fabrication process for body 41 of the smart soft actuator finger 27. A 3D-printed mold 131, including two separate elements: a main stand 133 and a space filler 135, is manufactured by an FDM 3D printer (Zmorph VX) with a polylactide (PLA) filament. Polyvinyl chloride (PVC) plastic tube 45 is inserted into the mold to create a coherent hole in the finger to later deploy the driven cable. The soft finger is then mold-casted by pouring a well-mixed Ecoflex 00-30 material 137 (Smooth-on Inc., USA) with a weight ratio of 1:1, into the mold. Then, the filled mold is cured at 80° C. for 2 h in an oven. After curing, the space filler and the space tube are removed to demold the soft finger body 41, and then PVC tube 45 is trimmed into several segments that match the length of the holes in the phalange segments. By inserting and bonding the PVC tubes into the holes, the potential friction generated on the elastomer by the cable pulling is reduced and thus prevents soft elastomer body from damage. Subsequently, elongated Nylon cable 47 is assembled into the soft finger actuator through the tubes with one end tied at the motor spindle and the other fixed on the tip end of the finger. The inner TENG is fabricated by bonding a copper tape onto a PET film with the same size to make the associated conductive strip and then attaching the PTFE layer at the top of the copper layer bonded with PET film to form the other conductive strip (also see FIG. 7C).

Figure 1D:
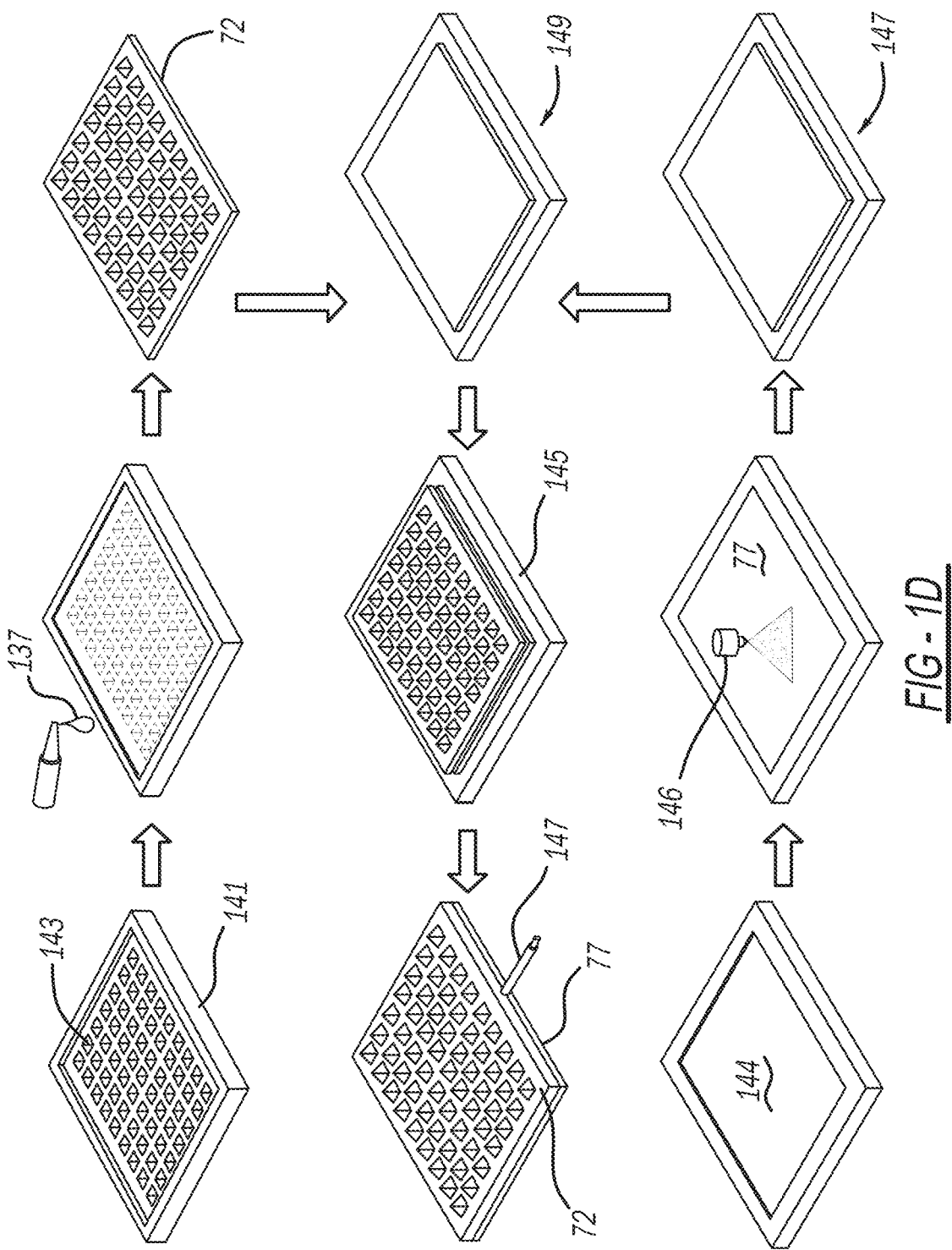
FIG. 1D is a series of perspective views showing a fabrication process for a tribo-skin patch of the present soft gripper.
Figure 1E:
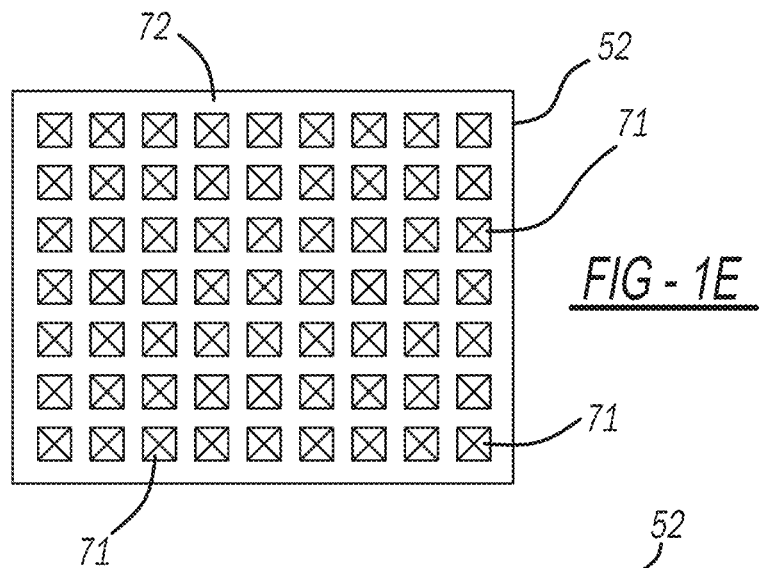
FIG. 1E is an elevational true view showing the tribo-skin patch of the present soft gripper, before an electrode is deposited thereon.

Compliant tribo-skin patch sensors 52 are also fabricated using a mold casting method, by way of non-limiting example. As shown in FIG. 1D, a SLA mold 141 is first printed with a ZRapid Z580 3D printer, and the mold is patterned with an array of micro-pyramid caves 143, 1.5 mm (width)×1.2 mm (height). The as-prepared Ecoflex 00-30 (A:B=1:1) material 137 is mixed by employing a Thinky 300 mixer and poured into the mold for curing at room temperature for 30 minutes, and the as-made patterned patch layer 72 is then peeled off from the mold, per FIG. 1E. After that, a thin electrode layer 77 is spray-coated onto the patterned patch with AgNWs solution (2.5 mg/mL) to form a tribo-skin. Due to the low adhesion of AgNWs with the Ecoflex material, an alternative dry transfer approach may be utilized to complete this step. In brief, a small glass slide 144 with its surface covered with PTFE film is first prepared in a patterning step for later AgNWs spraying by a sprayer 146, then after curing, the AgNW thin film electrode 77 is dry-transferred onto a thin silicon-rubber layer from the glass slide. Tape is removed therefrom at step 147 and a thin elastomeric film is cast at step 149.

Figure 1F:
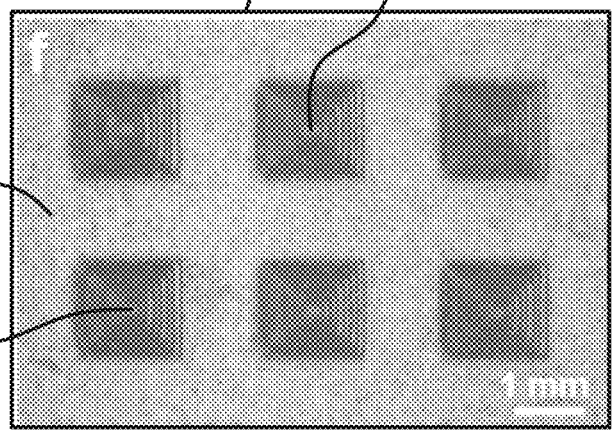
FIG. 1F is an enlarged microphotograph (1 mm scale) showing micro-pyramid structures patterned on the tribo-skin patch of the present soft gripper.
Figure 1G:
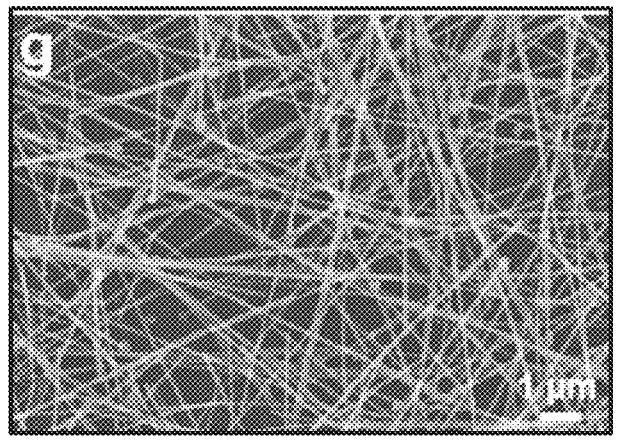
FIG. 1G is an enlarged SEM microphotograph (1 μm scale) showing an AgNW thin film electrode on a PTFE film of the tribo-skin patch of the present soft gripper.

Finally, the combined tribo-skin with the deposited AgNW electrode inside is bonded onto the phalange segments via a silicon rubber glue (Sil-Poxy) 145. An electric wire 147 is connected to AgNW layer 77 for electricity output. Again, FIG. 1F shows the top-view (via electron microscopy) of micro-pyramid structures 71 on the tribo-skin patch, and the AgNWs are uniformly sprayed on the PTFE film and distributed inside the tribo-skin patches as can be observed FIG. 1G.

While various features of the present invention have been disclosed, it should be appreciated that other variations may be employed. For example, different shapes and sizes of the silicon rubber finger(s) and/or TENGs can be employed, although various advantages of the present apparatus may not be realized. By way of example, the workpiece pressure sensor patches may use cones, domes or linearly elongated projections perpendicularly extending off of the nominal plane in place of the illustrated pyramids. Furthermore, a different electrical circuit and electronic components can be used with the present sensors, but certain cost and performance benefits may not be obtained. It is also envisioned that different actuators and movement transmission mechanisms may be used instead of or in addition to the preferred cables and electric motors; for example, fluid power pistons may move the cables, rods, tapes, chains or other such elongated members. Additionally, alternate materials can be employed, although performance and cost may differ. In another variation, a spring may cause the cable member and/or finger to be biased toward the bent or straight orientations. It is further envisioned that a single actuator may move multiple of the fingers. Features of each of the embodiments and uses may be interchanged and replaced with similar features of other embodiments, and all of the claims may be multiply dependent on each other in any combination. Variations are not to be regarded as a departure from the present disclosure, and all such modifications are intended to be included within the scope and spirit of the present invention.

The invention claimed is:

1. A soft gripper apparatus comprising:
a frame coupled to a movable robotic arm;
multiple elongated and polymeric fingers coupled to the frame, each of the fingers being bendable at multiple joints therein to move between bent workpiece-gripping orientations toward a centerline, substantially straight orientations and intermediate partially bent orientations;
an actuator;
an elongated and flexible member longitudinally moveable by the actuator to cause at least one of the fingers to move between the orientations;
multiple gripping triboelectric sensors mounted to an inner gripping surface of each of the fingers;
an elongated bending triboelectric sensor mounted to each of the fingers, the bending triboelectric sensor being laterally spaced apart from the gripping triboelectric sensors of each finger;
at least one of the triboelectric sensors generating electricity and sensing at least one of: a gripping characteristic or a finger bending characteristic; and
a programmable controller automatically controlling the actuator to vary a bending condition of the fingers in response to the sensed characteristic.

2. The apparatus of claim 1, wherein the member is a cable located at least partially inside one of the fingers and the actuator is an electric motor, and the fingers each include a single and elastomeric body split into multiple segments with a bendable and angular cut between each pair of the segments.

3. The apparatus of claim 1, wherein each of the gripping triboelectric sensors comprises a metal conductive layer between elastomeric layers, and each of the gripping triboelectric sensors is mounted on a segment of the associated finger with an angular cutout between the segments to act as the joints and allow bending therebetween.

4. The apparatus of claim 1, wherein each of the gripping triboelectric sensors including a nanowire layer covered by an external elastomeric layer including multiple projections therefrom.

5. The apparatus of claim 1, wherein each of the bending triboelectric sensors comprises multiple elongated metallic strips, and an elongated PTFE strip between the metallic strips, bending of the strips causes an electrical charge to flow between the metallic strips.

6. The apparatus of claim 1, wherein each of the bending triboelectric sensors has a longitudinal length of at least a majority longitudinal length of a polymeric body of the associated finger, each of the bending triboelectric sensors is located at and longitudinally beyond the joints of the associate finger, and each of the bending triboelectric sensors is substantially parallel to an elongated direction of the member.

7. The apparatus of claim 1, wherein the fingers are configured to pick, grasp and release a delicate agricultural workpiece therebetween without damage to the workpiece, and the finger are peripherally separated from each other by about 120° so as to inwardly curve toward each other.

8. The apparatus of claim 1, wherein the gripping and bending triboelectric sensors send different electrical signals to the programmable controller based on different workpiece gripping forces, workpiece weights and finger bending characteristics encountered.

9. A soft gripper apparatus comprising:
an elongated and flexible soft finger being bendably configured to grip a delicate workpiece;
a triboelectric sensor mounted to the finger;
an electrical circuit connected to the sensor operably receiving a signal from the sensor measuring a characteristic associated with the finger or a finger-to-workpiece interaction;
wherein the triboelectric sensor includes multiple longitudinally spaced apart tribo-skins, each including a nanowire layer covered by an external elastomeric layer including surface discontinuities thereon.

10. The apparatus of claim 9, further comprising:
an electric motor; and
a single elongated and flexible member longitudinally moveable by the motor to cause the finger to bend, the member extending at least a majority length of the finger and being coupled to the finger;
the member spanning across open gaps between integral segments of the finger, the finger flexing at the gaps.

11. The apparatus of claim 10, wherein the member is a cable located at least partially inside the finger and slidable within a hollow tube located in the finger.

12. The apparatus of claim 9, further comprising:
a bending triboelectric sensor comprising multiple elongated conductive strips, and an elongated polymeric strip between metallic strips, bending of the strips causes an electrical charge to flow between the conductive strips; and
second and third flexible fingers, all of the fingers being equally separated from each other so as to inwardly curve toward each other when gripping a workpiece.

13. The apparatus of claim 9, wherein the triboelectric sensor sends different electrical signals to the electrical circuit based on different workpiece gripping forces and workpiece weights encountered.

14. The apparatus of claim 9, wherein the triboelectric sensor is internally located with a flexible and polymeric body of the finger, the triboelectric sensor being substantially parallel to an inner gripping surface of the finger and being elongated at least a majority length of the finger.

15. The apparatus of claim 9, further comprising:
an electric motor causing bending and straightening of the finger;
the fingers being peripherally separated from each other by about 120° so as to inwardly curve toward each other; and
a programmable controller connected to the electrical circuit, the programmable controller automatically controlling energization of the electric motor to vary a bending condition of the finger in response to characteristic sensed by the triboelectric sensor.

16. A soft gripper apparatus comprising:
elongated, soft and bendable fingers picking, grasping and releasing a delicate agricultural workpiece therebetween without damage to the workpiece;
multiple triboelectric sensors located on gripping surfaces of the fingers;
an electrical circuit connected to the sensor operably receiving a signal from the sensors measuring a characteristic associated with the fingers or a finger-to-workpiece interaction.

17. The apparatus of claim 16, wherein the triboelectric sensor includes multiple longitudinally spaced apart tribo-skins, each including a nanowire layer covered by an external elastomeric layer including surface discontinuities thereon.

18. The apparatus of claim 16, wherein the triboelectric sensor sends different electrical signals to the electrical circuit based on different workpiece gripping forces and workpiece weights encountered.

19. The apparatus of claim 16, wherein the triboelectric sensor is internally located with a flexible and polymeric body of a first of the fingers, the triboelectric sensor being substantially parallel to an inner gripping surface of the first of the fingers and being elongated at least a majority length of the first of the fingers.

20. The apparatus of claim 16, further comprising:
an electric motor causing bending and straightening of a first of the fingers;
the fingers being separated from each other by about 120° so as to inwardly curve toward each other; and
a programmable controller connected to the electrical circuit, the programmable controller automatically controlling energization of the electric motor to vary a bending condition of the finger.

21. The apparatus of claim 16, wherein at least one of the sensors senses workpiece contact force and harvests energy.

22. A soft gripper apparatus comprising:
an elongated and flexible soft finger being bendably configured to grip a delicate workpiece, the finger including a single and elastomeric body split into multiple segments with a bendable and angular valley between each pair of the segments;
multiple spaced apart sensors mounted to the finger;
an electric motor located adjacent an end of the finger;
a cable located at least partially internal to the finger;
the sensors operably sending signals measuring at least one characteristic associated with the finger or a finger-to-workpiece interaction; and
a programmable controller connected to the sensors, the programmable controller automatically controlling energization of the electric motor to vary a bending condition of the finger in response to the at least one characteristic.

23. The apparatus of claim 22, wherein at least one of sensors is a triboelectric sensor internally located with a flexible and polymeric body of the finger, the triboelectric sensor being substantially parallel to an inner gripping surface of the finger and being elongated at least a majority length of the finger.

24. The apparatus of claim 22, wherein at least one of sensors is a triboelectric sensor which sends different electrical signals to the programmable controller based on different agricultural workpiece gripping forces and agricultural workpiece weights encountered.

25. The apparatus of claim 22, wherein a first of the sensors is internal to the body and spanning through the segments thereof, to detect bending of the finger, and a second of the sensors is located on a workpiece contacting inner surface of each of the segments to measure contact pressure of the finger to the workpiece.

26. The apparatus of claim 22, wherein at least one of the sensors senses workpiece contact force and harvests energy.

27. The apparatus of claim 22, further comprising second and third flexible and polymeric fingers, all of the fingers being separated from each other by about 120° so as to inwardly curve toward each other.

* * * * *